(12) United States Patent
Shirase

(10) Patent No.: US 9,145,514 B2
(45) Date of Patent: Sep. 29, 2015

(54) TEMPERATURE MANAGEMENT INDICATOR AND STRUCTURE HAVING THE SAME ATTACHED

(75) Inventor: Hitoshi Shirase, Kawagoe (JP)

(73) Assignee: NICHIYU GIKEN KOGYO CO., LTD., Kawagoe (JP)

( * ) Notice: Subject to any disclaimer, the term of this patent is extended or adjusted under 35 U.S.C. 154(b) by 490 days.

(21) Appl. No.: 13/638,320

(22) PCT Filed: Mar. 31, 2011

(86) PCT No.: PCT/JP2011/058219
§ 371 (c)(1),
(2), (4) Date: Sep. 28, 2012

(87) PCT Pub. No.: WO2011/125837
PCT Pub. Date: Oct. 13, 2011

(65) Prior Publication Data
US 2013/0014690 A1    Jan. 17, 2013

(30) Foreign Application Priority Data

Mar. 31, 2010    (JP) ................................. 2010-081586

(51) Int. Cl.
*G01K 1/02*    (2006.01)
*G01K 11/12*    (2006.01)
(Continued)

(52) U.S. Cl.
CPC ... *C09K 9/02* (2013.01); *G01K 3/04* (2013.01); *G01K 11/12* (2013.01)

(58) Field of Classification Search
CPC ............ G01K 11/12; G01K 11/00; C09D 5/26
USPC ......... 374/102–106, 162, 100, 101, 109, 159; 116/216
See application file for complete search history.

(56) References Cited

U.S. PATENT DOCUMENTS 3,821,376 A    6/1974    Bayer et al.
4,661,305 A *  4/1987    Carlomagno ................. 264/132
(Continued)

FOREIGN PATENT DOCUMENTS

JP    A-51-044706    11/1976
JP    A-51-044709    11/1976
(Continued)

OTHER PUBLICATIONS

Lavrenova et al., "Iron(II) Complexes with 4-R-1,2,4-Triazoles (R =Ethyl, Propyl) Exhibiting $^1A_1 \leftrightarrow {}^5T_2$ Spin Transition," *Russian Journal of Coordinate Chemistry*, vol. 27, No. 1, pp. 46-50, 2001.
(Continued)

*Primary Examiner* — Gail Kaplan Verbitsky
(74) *Attorney, Agent, or Firm* — Oliff PLC

(57) ABSTRACT

A temperature management indictor having simple structure is provided, which, not containing a hazardous metal, especially mercury among others, is safe and excellently durable, especially durable against light and repetition of heating and cooling cycle, is capable of indicating specific temperature ranges by means of reversible color changes, and also is able, as need be, to indicate an arrival at a specific temperature by means of an irreversible color change. A temperature management indicator 10 comprises; a reversible temperature indicating member 14 including reversible temperature indicating pigment particles devoid of mercury, which reversibly undergoes color changes at a predetermined temperature, wherein in the reversible temperature indicating member 14, the reversible temperature indicating pigment particles contain an iron-containing complex compound and are dispensed to be dispersed in a resin thereof.

7 Claims, 7 Drawing Sheets

(51) Int. Cl.
*C09K 9/02* (2006.01)
*G01K 3/04* (2006.01)

(56) References Cited

U.S. PATENT DOCUMENTS

| | | | |
|---|---|---|---|
| 4,717,710 A * | 1/1988 | Shimizu et al. | 503/213 |
| 4,732,810 A * | 3/1988 | Kito et al. | 428/402.2 |
| 5,573,848 A | 11/1996 | Van Praet | |
| 5,597,238 A | 1/1997 | Colley et al. | |
| 5,667,303 A | 9/1997 | Arens et al. | |
| 5,709,472 A | 1/1998 | Prusik et al. | |
| 5,718,513 A | 2/1998 | Booth et al. | |
| 5,997,927 A | 12/1999 | Gics | |
| 5,997,964 A | 12/1999 | Klima, Jr. | |
| 6,042,264 A * | 3/2000 | Prusik et al. | 374/106 |
| 6,244,208 B1 | 6/2001 | Qiu et al. | |
| 6,289,794 B1 | 9/2001 | Carmon | |
| 6,331,076 B1 | 12/2001 | Coll | |
| 6,382,125 B1 | 5/2002 | Tamura | |
| 6,435,128 B2 | 8/2002 | Qiu et al. | |
| 6,564,742 B2 | 5/2003 | Perner et al. | |
| 6,582,803 B2 | 6/2003 | Cole et al. | |
| 6,712,996 B2 | 3/2004 | Wu et al. | |
| 6,786,638 B1 | 9/2004 | Bonds et al. | |
| 7,063,041 B2 | 6/2006 | Odashiro | |
| 7,422,913 B2 | 9/2008 | Jiang | |
| 7,429,414 B2 | 9/2008 | Nagae | |
| 7,517,146 B2 | 4/2009 | Smith et al. | |
| 7,517,475 B2 | 4/2009 | Lucht et al. | |
| 7,600,912 B2 | 10/2009 | Leute et al. | |
| 7,719,404 B2 | 5/2010 | Makela et al. | |
| 7,891,310 B2 * | 2/2011 | Taylor et al. | 116/216 |
| 7,963,694 B2 | 6/2011 | Leute et al. | |
| 8,029,190 B2 | 10/2011 | MacDonald et al. | |
| 8,066,432 B2 | 11/2011 | Yang et al. | |
| 2004/0190591 A1 | 9/2004 | Zhang | |
| 2005/0177063 A1* | 8/2005 | Winnie | 600/549 |
| 2006/0011124 A1* | 1/2006 | Odashiro | 116/219 |
| 2006/0032427 A1 | 2/2006 | Ishii et al. | |
| 2007/0280331 A1 | 12/2007 | Lin | |
| 2008/0063026 A1* | 3/2008 | Roche | 374/162 |
| 2008/0075956 A1 | 3/2008 | Murtha | |
| 2010/0178511 A1* | 7/2010 | Letard et al. | 428/404 |
| 2012/0010030 A1* | 1/2012 | Bousseksou et al. | 473/490 |
| 2012/0055393 A1 | 3/2012 | Wang | |
| 2012/0147927 A1 | 6/2012 | Yu | |
| 2013/0011680 A1* | 1/2013 | Letard et al. | 428/404 |

FOREIGN PATENT DOCUMENTS

| | | |
|---|---|---|
| JP | B2-02-019155 | 4/1990 |
| JP | A-2001-281002 | 10/2001 |
| JP | A-2005-187413 | 7/2005 |
| JP | A-2007-101469 | 4/2007 |
| JP | A-2007-131673 | 5/2007 |
| JP | A-2008-239810 | 10/2008 |
| JP | B1-4175519 | 11/2008 |
| JP | A-2009-031667 | 2/2009 |
| JP | A-2009-185086 | 8/2009 |
| JP | 2013090882 A * | 5/2013 |
| WO | WO 2009/007534 A2 | 1/2009 |

OTHER PUBLICATIONS

Kuroiwa et al., "Heat-Set Gel-like Networks of Lipophilic Co(II) Triazole Complexes in Organic Media and Their Thermochromic Structural Transitions," *Journal of the American Chemical Society*, vol. 126, pp. 2016-2021, 2004.

Krober et al., "A Spin Transition System with a Thermal Hysteresis at Room Temperature," *Journal of the American Chemical Society*, vol. 115, pp. 9810-9811, 1993.

International Search Report issued in Application No. PCT/JP2011/058219; Dated May 10, 2011 (With Translation).

Kahn et al., "Iron(II)-1,2,4-triazole spin transition molecular materials," Phil. Trans. R. Soc. Lond, 1996, vol. 354, pp. 359-379.

Koningsbruggen et al., "Non-classical $Fe^{II}$ spin-crossover behavior in polymeric iron (II) compounds of formula [Fe(NH$_2$trz)$_3$] X$_2$ · xH$_2$O (NH$_2$trz = 4-amino-1,2,4-triazole; X = derivatives of naphthalene sulfonate)," J. Mater. Chem., 1997, vol. 7, pp. 2069-2075.

Lavrenova et al., "Spin transitions in coordination compounds of iron(II) with triazoles," Institute of Inorganic Chemistry, 1991, vol. 16, pp. 349-355.

Lavrenova et al., "$^1A_1 \leftrightarrows {}^5T_2$ Spin Transition in New Thermochromic Iron(II) Complexes with 1,2,4-Triazole and 4-Amino-1,2,4-Triazole," Russian Journal of Coordination Chemistry, 2003, vol. 29, pp. 22-27.

* cited by examiner

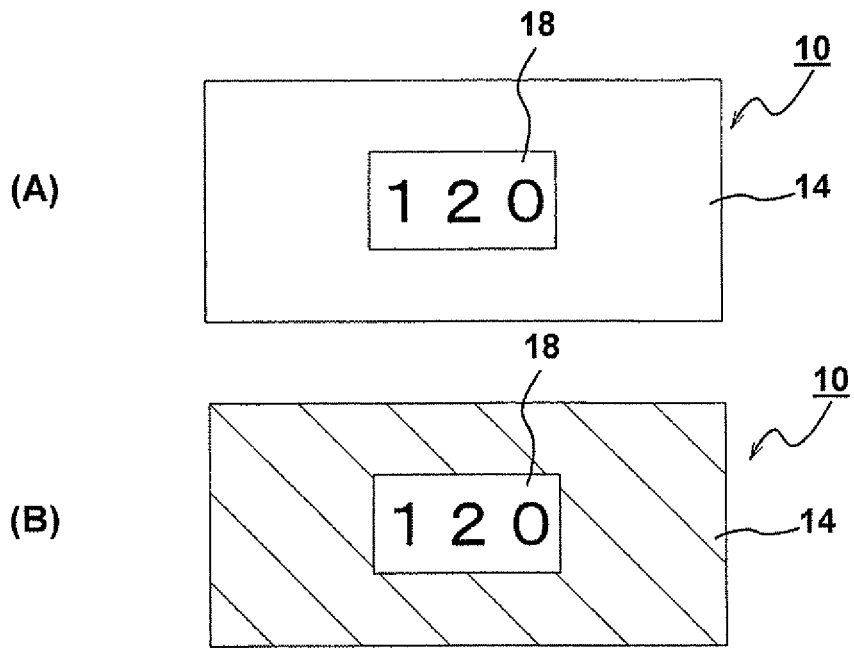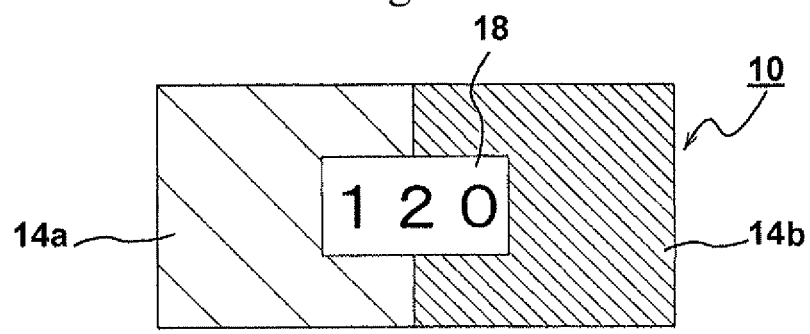

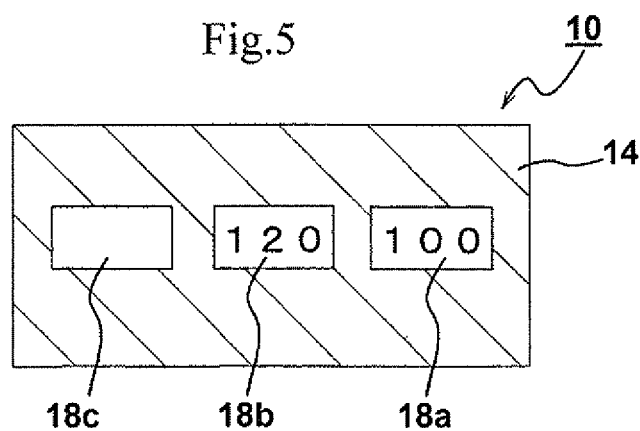
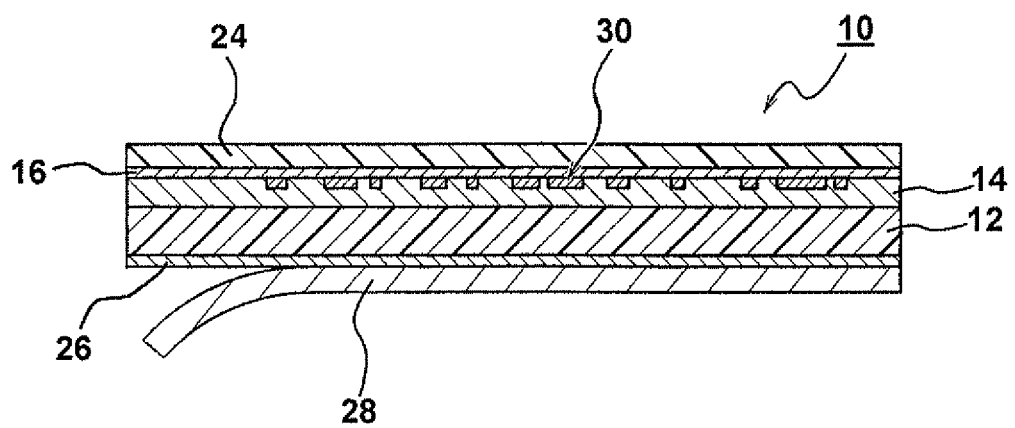

TEMPERATURE MANAGEMENT INDICATOR AND STRUCTURE HAVING THE SAME ATTACHED

TECHNICAL FIELD

The present invention relates to a temperature management indicator adapted to indicate a temperature to be detected or measured through variation in visible color tone, and a structure equipped with a temperature variation portion having such an indicator.

BACKGROUND TECHNOLOGY

There have been temperature indicators that indicate particular temperature ranges without a use of a temperature measurement mechanical device or a mercury thermometer or the like for the purpose of temperature management of machines, installations or constant temperature preservation products. As such temperature indicators, there are known temperature indicators which indicate color tones corresponding to the temperatures by means of a temperature indicating member utilizing a temperature indicating pigment which undergoes reversible color changes. These temperature indicators are used for the purposes of temperature management of a mechanical installation and burn prevention and the like, for the reason that it is possible to monitor the real-time temperature with ease through observation of the reversible variation in color tone. In the former time, a mercury-containing halogen complex compound was commonly adopted as the temperature indicating material used in such temperature indicating members. However, in recent years this use has been progressively abandoned from the viewpoint of protection of human health and environment against mercury.

As a reversible temperature indicator not including mercury, there have been known, for example, ones making use of electron-donating organic compound or such organic pigment which reversibly exhibit colors in response to temperatures and ones making use of organic paints contained in microcapsules; such examples are described in Patent Documents 1 through 4 listed below. However, generally speaking, organic compounds have a tendency to decompose with time, so that the indicators making use of temperature indicating materials made of the organic compounds, or ones making use of microcapsules containing the organic compounds, and ones carrying organic compounds coated with polyester film are apt to be unsatisfactory in terms of durability, especially light stability.

Also, as a reversible temperature indicator not including mercury, there have been known, for example, a temperature indicating member containing cobalt compounds which reversibly exhibit colors in response to temperatures, as described in Patent Documents 5 and 6. Compared with the temperature indicating members containing mercury-containing halogen complex compound, the temperature indicating members containing such cobalt compounds are designed with more consideration for the protection of human body and environment, and as such they are safe and useful up to a certain level, but from the fact that cobalt compounds are themselves environmentally hazardous substances. Therefore, there has been a concern that their use would not sustain ecological safety and environmental protection. For example, in EU's Registration, Evaluation, Authorisation and Restriction of Chemicals (REACH), cobalt(II) chloride, which is a cobalt compound, is included in "Candidate List of Substance of Very High Concern for authorization" published by European Chemical Agency, which enumerates items to which industries are required to impart special management (ref. Nikkei Ecology, September Edition, 2008). Furthermore, a cobalt (II) triazole complex compound, in which ligand is tirazole and the central metal to which triazole is coordinated is cobalt, also performs thermochromism to reversibly change its hue in response to temperatures, as described in below-listed non-Patent Document 1, but since it also contains cobalt metal there is a possibility that it receives some sort of regulation in future.

Now, in publications such as below-listed non-Patent Documents 2 and 3, it is described that an iron triazole complex compound, which is an iron-containing complex compound, undergoes reversible color change at particular temperatures. However, powdery iron triazole complex compound is poor in durability and does not make a practical temperature indicating pigment for temperature indicating member. Also, as a functional film device utilizing an iron triazole complex compound there is described in below-listed Patent Document 7, for example, an electrooptically functional film device, which contains an iron triazole complex compound and is made into a film form. This functional film is synthesized by emulsion polymerization method so that it is necessary to control the particle diameter responsive to the applications and thus requires extra time and cost. Furthermore, with this functional film device, its portion that contains iron complex is of a discontinued semi-spherical shape, so that it incurs limitation to the design-ability of the temperature indicator material as well as cost increase. Also, as an example of an application of using an iron triazole complex compound, there is disclosed in below-listed Patent Document 8, for example, an iron triazole complex compound having a ligand of a particular highly integrated structure, which is used as a storage element and the like rather than as a temperature indicating member. And in Patent Document 9, there is disclosed an optical element having a layer containing a liquid crystal gel, which is formed by a gelled composition including a triazole metal complex and a liquid crystal compound.

PRIOR ART DOCUMENTS

Patent Documents

[Patent Document 1] Japanese Examined Patent Application Publication No. 1976-44706
[Patent Document 2] Japanese Examined Patent Application Publication No. 1976-44709
[Patent Document 3] Japanese Examined Patent Application Publication No. 1990-19155
[Patent Document 4] Japanese Published Patent Application No. 2007-101469
[Patent Document 5] Publication of Japanese Patent No. 4175519
[Patent Document 6] Japanese Published Patent Application No. 2009-185086
[Patent Document 7] Japanese Published Patent Application No. 2009-31667
[Patent Document 8] Japanese Published Patent Application No. 2005-187413
[Patent Document 9] Japanese Published Patent Application No, 2007-131673

Non-Patent Documents

[non-Patent Document 1] Journal of the American Chemical Society, 2004, Vol. 126, p. 2016-2021

[non-Patent Document 2] Journal of the American Chemical Society, 1993, Vol. 115, p. 9810-9811
[non-Patent Document 3] Russian Journal of Coordination Chemistry, 2001, Vol. 27, No. 1, p 46-50

SUMMARY OF INVENTION

Problem to be Solved by the Invention

The present invention was made in view of solving the above-described problems, and its object is to provide a temperature management indicator, which has a simple structure, does not contain hazardous metals especially mercury, is safe, is durable, especially so against light and repetition of heating and cooling cycle, is capable of indicating specific temperature ranges by means of reversible color changes, and also is capable, when necessary, of indicating an arrival at a specific temperature by means of an irreversible color change, and also it is an object of the invention to provide a structure equipped with such a temperature management indicator.

Means for Solving Problem

The temperature management indicator of the present invention comprises;
a reversible temperature indicating member including reversible temperature indicating pigment particles devoid of mercury, which reversibly undergoes color changes at a predetermined temperature,
wherein in the reversible temperature indicating member, the reversible temperature indicating pigment particles contain an iron-containing complex compound and are dispensed to be dispersed in a resin thereof.

In the temperature management indicator of the present invention, the iron-containing complex compound may be an iron triazole complex compound.

In the temperature management indicator of the present invention, the reversible temperature indicating pigment particles may be dispersed in the resin within the temperature indicating member configuring of an ink layer or a shaped body In the temperature management indicator of the present invention, the reversible temperature indicating pigment particles may be dispersed in the ink layer, which is formed by making an ink from a resin component constituting the resin and the particles and then by applying the ink onto a base plate; or may be dispersed in the shaped body, which is formed to have a predetermined configuration after the particles are kneaded in the resin.

In the temperature management indicator of the present invention, the reversible temperature indicating member and an irreversible temperature indicating member devoid of mercury may be arranged on an indicator base plate such that they lie side by side or overlap each other in part,
and the irreversible temperature indicating member includes a thermofusible substance-absorptive base material, which covers a surface thereof and which exposes the surface where the thermofusible substance is fused to be irreversibly absorbed, when the solid-state thermofusible substance is turned to a thermofused state at a predetermined detection temperature; or a thermofusible substance-permeable material, which covers a surface thereof and which exhibits a color when the colored thermofusible substance irreversibly is fused to permeates, when the solid-state colored thermofusible substance is turned to a thermofused state at a predetermined detection temperature; or a color changeable layer containing a temperature sensitive color variant substance that changes color by undergoing a irreversible reaction at a predetermined detection temperature.

In the temperature management indicator of the present invention, an invariant display member, which is provided with a color different from a hue that is exhibited by the reversible temperature indicting pigment either at temperatures below the color-changing temperature of the reversible temperature indicating pigment or at temperatures not lower than the color-changing temperature, may be formed on the surface of the reversible temperature indicating member.

In the temperature management indicator of the present invention, the reversible temperature indicating member may be covered with a polymer film selected from the group consisting of polyester film, polystyrene film, polyimide film, polycarbonate film, cellulose triacetate film, polyvinyl alcohol film, polyvinyl chloride film, cellophane film, polyamide film, polymethyl (meth)acrylate film, polyolefin film, and polyvinyl acetate film.

A structure of the present invention equipped with;
a temperature variable portion, which the temperature of the temperature variable portion is changeable in response to a heat source placed outside or inside the structure,
wherein the temperature management indicator is attached to the temperature variable portion of the structure.

Effect of the Invention

In the reversible temperature indicating member constituting the temperature management indicator according to the present invention, the reversible temperature indicating pigment particles containing the ion-containing complex compound which undergoes color changes reversibly at a predetermined temperature to be detected or measured are dispersed in the resin. By virtue of this, it is possible to apply the reversible temperature indicating pigment particles to the base material by means of this resin simply and uniformly. Furthermore, irrespective of whether the face to be coated on the base material to which the reversible temperature indicating pigment particles are applied is flat or curved or three-dimensional, or irrespective of whether the base material is flexible or rigid, it is possible to apply the reversible temperature indicating pigment particles simply and securely. Also, as the surfaces of the reversible temperature indicating pigment particles are sealed with the resin and thus insulated from the external environment, so that the reversible temperature indicating pigment is prevented from undergoing deterioration by oxidation, etc., and thus the temperature management indicator does not degrade for a long term.

With the temperature management indicator according to the present invention, there is no need to use a large-sized and costly thermometry measurement machine or apparatus or a mercury thermometer, and by virtue of clear alteration in color tone, it is possible to simply and accurately obtain a display indicating the temperature as of the time of the visual observation and, when need be, a display showing a chronological temperature history in an integral or transit way. Also, as there is no inclusion of a hazardous metal such as mercury, the present indicator is safe to the human body and the environment and as it is excellent in anti-light durability and durability against repetition of heating and cooling cycle, it is stout and has a long effective life time. Furthermore, it is compact and simple in structure, and thus easy to manufacture and low in price. Also, in the fields of industries such as machinery, installation, precision machine, food, medicine, medical care, etc., where the technology using the conventional temperature indicating member was not commonly used from the viewpoint of environmental pollution problem or poor durability such as anti-light durability, it is possible to use the present temperature management indicator. For various temperature management objects in these extensive fields, it is possible to use the temperature management indicator of the present invention by attaching it to the temperature changeable portion of those objects where at least one part undergoes temperature variation, it is possible to assist, without use of a power source, prevention of machine malfunctioning and material deterioration/degradation or burn on the human operator arising from overheating, and to assist alarming against quality deterioration caused by machine malfunctioning arising from overheating of overcooling, so that this temperature management indicator is useful for the temperature management of these objects.

BRIEF DESCRIPTION OF DRAWINGS

FIG. 3 is a plan view illustrating changes in color tone in response to the ambient temperature in a case of another temperature management indicator according to the present invention.

FIG. 4 is a plan view illustrating changes in color tone in response to the ambient temperature in a case of still another temperature management indicator according to the present invention.

FIG. 5 is a plan view illustrating changes in color tone in response to the ambient temperature in a case of yet another temperature management indicator according to the present invention.

FIG. 6 is a schematic drawing of longitudinal section illustrating other example of a temperature management indicator according to the present invention.

EXPLANATIONS OF LETTERS OR NUMERALS

Figure 1:
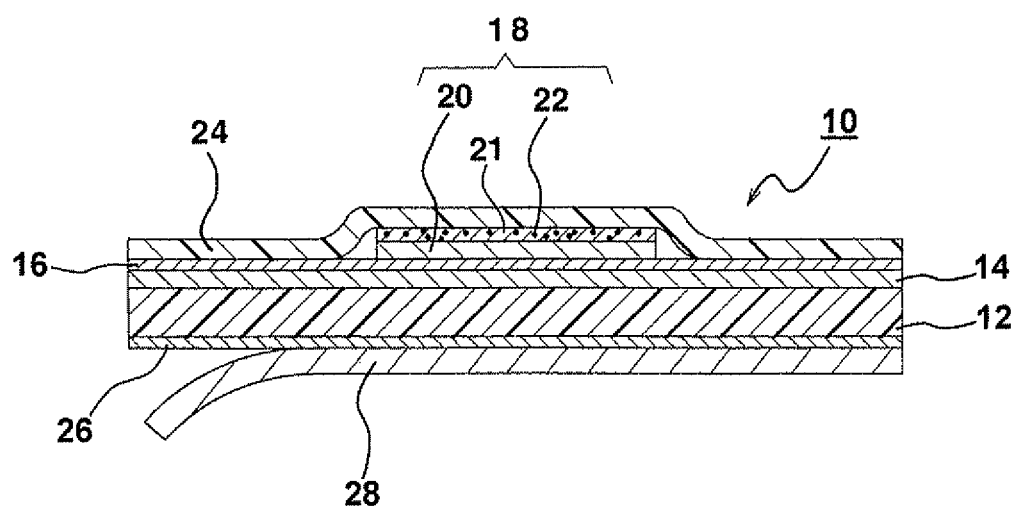
FIG. 1 is a schematic drawing of longitudinal section illustrating an example of a temperature management indicator according to the present invention.

Reference numeral 10 is a temperature management indicator, 12 is a base plate, 14 is a reversible temperature indicating member, 16 is an adhesive layer, 18, 18a 18b, 18c are irreversible temperature indicating members, 20 is an absorbent base member, 21 is an ink layer, 22 is a thermofusible substance, 24 is a polymer film, 26 is an adhesive layer, 28 is a release paper, 30 is an invariant display member, 31 is a polymer film, 32 is an invariant display member, 33 is a while color unchangeable ink layer, and 40 is a pipe.

MODE FOR CARRYING OUT THE INVENTION

Hereunder, embodiments to practice the present invention in detail will be explained, but the scope of the present invention is not limited by these embodiments.

FIG. 1 shows an example of a temperature management indicator 10 according to the present invention. A film-like reversible temperature indicating member 14 is provided on one side face of a base plate 12, which constitutes a base structure for the temperature management indicator 10, as shown in FIG. 1. This reversible temperature indicating member 14 is formed as a film-like ink layer through an application of an ink composite containing reversible temperature indicating pigment particles and a resin component such as the binder resin. Over a middle part of a surface of this reversible temperature indicating member 14 is stuck an irreversible temperature indicating member 18 via an adhesive layer 16. This irreversible temperature indicating member 18 is constituted by an absorbent base member 20 stuck to the reversible temperature indicating member 14 by means of the adhesive layer 16 and an ink layer 21, which is formed like a film attached to a surface of the absorbent base member 20 and contains a thermofusible substance 22. The revealed face of this irreversible temperature indicating member 18 and that of the reversible temperature indicating member 14 are to make the observation faces and are covered up with a transparent polymer film 24. Incidentally, to the other side face of the base plate 12, which is the non-observation face, is attached detachably a release paper 28 via an adhesive layer 26.

In the reversible temperature indicating member 14 is contained a powdery or granular iron-containing complex compound, which undergoes color changes reversibly in response to a specific temperature range corresponding to a predetermined temperature to be detected or measured, together with a binder resin. For this reason, the reversible temperature indicating member 14 containing the iron-containing complex compound changes its hue, when its temperature is raised from a low temperature of lower than that at which the iron-containing complex compound changes its color (herein-below, sometimes, referred to as color-change temperature) to a high temperature equal to or higher than the color-change temperature, and then this is represented by a change in color tone of the temperature management indicator 10. On the other hand, when the reversible temperature indicating member 14 is cooled again from the high temperature equal to or higher than the color-change temperature of the iron-containing complex compound to a low temperature below the color-change temperature, the hue exhibited turns back to the original hue, which is represented by a reverting of the color tone of the temperature management indicator 10 to the original tone. Therefore, by visually observing the color tone of the reversible temperature indicating member 14 of the temperature management indicator 10, it is possible to judge simply whether the current temperature is lower than the color-change temperature of the iron-containing complex compound or equal to or higher than the color-change temperature. This iron-containing complex compound can be a complex compound of which the central metal is iron, and it is especially preferable to use iron triazole complex compound.

When temperature is increased from a starting low temperature to a high temperature equal to or higher than a color-change temperature specific to an iron-containing complex compound, the iron-containing complex compound, especially a iron triazole complex compound, undergoes a spin crossover phenomenon whereby the spin state is changed and the hue changes from non-white (for example, mainly pink color) to white. When the temperature turns back from the high temperature to the low temperature, the iron triazole complex reversibly turns back to the former spin state whereupon a color change occurs from white to non-white (for example, mainly pink color), and thus the original hue is recovered. Accordingly, the reversible temperature indicating member 14 containing the iron triazole complex compound also undergoes changes in its color tone correspondingly to the color changes of the iron triazole complex compound, when the temperature rises from below the color-change temperature of the iron triazole complex compound to the color-change temperature or higher and when the temperature goes down from the color-change temperature or higher to below the color-change temperature. Henceforth, it is possible to simply judge whether the current temperature is lower than the color-change temperature of the iron triazole complex compound or equal to or higher than the color-change temperature by visually observing the color tone of the reversible temperature indicating member 14.

This iron triazole complex compound is a transition metal complex composed, for example, of a divalent iron cation as the central metal, triazole or its derivative, which is a ligand coordinated to the central metal, and counter anions. As for the iron triazole complex compound, it can exist as a hydrate or an anhydrite, and either will be used. As for the triazole and its derivative, which make the ligands, are preferably ones that are coordinated to iron (II) cation and become ligands that causes the spin crossover phenomenon, and examples thereof are 1,2,4-triazole, 4-methyl-1,2,4-triazole, 4-ethyl-1,2,4-triazole, 4-propyl-1,2,4-triazole, 4-butyl-1,2,4-triazole, 4-pentyl-1,2,4-triazole, 4-hexyl-1,2,4-triazole, 4-amino-1,2,4-triazole, 4-amino-1,2,4-triazole and their derivatives. These ligands may be used singly or in plural. As for the iron triazole complex compound, it can be either a complex compound composed of a single or a plurality of the ligands. As for the counter anion of the complex compound, examples include anions which forms a counter anion with respect to iron (II) triazole complex cation, such as $F^-$, $Cl^-$, $Br^-$, $I^-$, $Al^-$, $SO_4^{2-}$, $SO_3^{2-}$, $HSO_4^{2-}$, $HSO_3^{2-}$, $S_2O_3^{2-}$, $OH^-$, $NO_3—$, $BF_4—$, $ClO_4—$, $NCS^-$, $CN^-$, $SCN^-$, $CH_3COO^-$, $HCOO^-$, $C_2O_4^{2-}$, $CO_3^{2-}$, $HPO_4—$, $PF_6^{2-}$, $SiF_6^{2-}$, $B(C_6H_5)_4—$, $C_6H_5—SO_3—$, $CH_3—C_6H_4—SO_3—$, $C_2H_5—C_6H_4—SO_3—$, $C_{10}H_7—SO_3—$, $NH_2—C_{10}H_6—SO_3—$, $HO—C_{10}H_6—SO_3—$, $SF_3—SO_3—$, $CH_3—SO_3—$, $C_2H_5—SO_3—$, $C_3H_7—SO_3—$, $C_4H_9—SO_3—$, $C_5H_{11}—SO_3—$, $C_6H_{13}—SO_3—$, $R—SO_3—$ (wherein R is either a saturated or an unsaturated hydrocarbon group and/or aromatic group). These anions may be used singly or in plural. The iron triazole complex compound may be a complex compound having either a single or a plurality of counter anions. As this iron triazole complex compound, 4-amino-1,2,4-triazole iron sulfate complex compound, or 4-amino-1,2,4-triazole iron bromide complex compound, or 4-amino-1,2,4-triazole iron tetrafluoroborate complex compound can be used most preferably.

Such reversible temperature indicating member 14 can be simply formed by adhering, through means of coating, spraying or printing a film of ink composition onto one face of the base plate 12, which is prepared by dispersing reversible temperature indicating pigment particles in a resin component, which is a resin raw material monomer or a resin material, in the presence of a solvent, as need be, and then by volatilizing the solvent or curing the resin raw material monomer, whereby a film-like ink layer containing the reversible temperature indicating pigment particles and a binder resin, in which the particles are dispersed.

Like this, it is possible to apply the reversible temperature indicating pigment particles dispersed in the resin to the base plate 12 with ease, by first making an ink from the reversible temperature indicating pigment particles and the resin element, and then by coating, spraying or printing the ink over a predetermined position of the observation face of the base plate 12. After preparing the ink from an ink composition with the resin element which can be applied by coating or printing and then coating, spraying or printing the ink onto a face of the base plate 12, the reversible temperature indicating member 14 is so formed that the iron complex compound can be securely applied thereto. And regardless of whether the base plate 12 is flexible or rigid, and regardless of whether the surface to be coated on the base plate 12 is flat or curved or three-dimensional, it is possible to achieve simply a uniform and smooth application. Also, as the particles of the iron-containing complex compound used as the reversible temperature indicating pigment have their surfaces covered with the resin, they are insulated and isolated from the external oxygen and moisture, and thus they are prevented from undergoing deterioration and degradation attributable to oxidation, decomposition and the like.

To prepare the ink from the raw material constituting the reversible temperature indicating member 14, the iron-containing complex compound is mixed with the resin element, which is the binder resin to constitute the binder, and solvent and additive, as need be, and the like, to thereby obtain the ink composition. On this occasion, it is preferable that thus iron type complex compound, the binder, and the solvent are kneaded together in a weight ratio of 0.1-100:0.1-50:1-500 for the preparation respectively. Furthermore, it is possible to add an additive in an appropriate amount, as need be, to this ink composition.

The binder used for the ink preparing can be exemplified by vinyl resin, silicone resin, rosin resin, terpene resin, phenol resin, alkyd resin, polyester resin, polyether resin, acrylic resin, polyurethane resin, epoxy resins, ketone resin, maleic resin, coumarin resin, polyvinyl alcohol resin, polyvinyl butyral resin, polyethylene resin, ethylene-vinyl acetate copolymer resin, vinyl chloride-vinyl acetate copolymer, polypropylene resin, polyvinyl chloride resin, polyvinylidene chloride resin, polyvinyl acetate resin, polyvinyl formal resin, polystyrene resin, styrene-acrylonitrile copolymer resin, ABS resin, polymethyl methacrylate resin, MMA-styrene copolymer resin, polycarbonate resin, ethyl cellulose resin, acetylcellulose resin, propyl cellulose resin, cellulose acetate butyrate resin, nitrocellulose resin, polychlorofluoroethylene resin, polytetrafluoroethylene resin, tetrafluoroethylene-hexafluoroethylene copolymer resin, polyvinylidene fluoride resin, polyurethane resin, nylon 6 resin, nylon 66 resin, nylon 610 resin, nylon 11 resin, polyethylene terephthalate resin, polybutyrene terephthalate resin, polycyclohexane terephthalate resin, urea resin, melamine resin, methyl cellulose, ethyl cellulose, natural rubber, synthetic rubber, petroleum resin, fat and oil, etc. Any of these can be used singly or in combination.

The solvent that is used with the binder can be exemplified by n-hexane, n-heptane, mineral spirit, ink oil, solvent naphtha, methyl alcohol, ethyl alcohol, n-propyl alcohol, isopropyl alcohol, n-butyl alcohol, secondary butyl alcohol, isobutyl alcohol, cyclohexyl alcohol, 2-methylcyclohexyl alcohol, tridecyl alcohol, benzene, toluene, xylene, tetralin, dipentene, heptane, methylisobutylcarbinol, ethylene glycol, propylene glycol, diethylene glycol, triethylene glycol, dipropylene glycol, tetrahydrofuran, methyl acetate, ethyl acetate, isopropyl acetate, butyl acetate, isoamyl acetate, acetone, methyl ethyl ketone, methyl isobutyl ketone, diacetone alcohol, diethyl ketone, ethyl amyl ketone, methylcyclohexane, isobutyl ketone, diacetone alcohol, isophorone, dimethylformamide, cyclohexane, cyclohexanone, methylcyclohexanone, dichloromethane, chloroform, tetrachloromethane, cellosolve, methyl cellosolve, ethyl cellosolve, butyl cellosolve, carbitol, butyl carbitol, cellosolve acetate, butyl cellosolve acetate, carbitol acetate, butyl carbitol acetate, diethylbenzene, and water, etc. Also these can be used singly or as a mixture of two or more.

As for the additive that is used along with the binder and the solvent, candidates include a material that improves the resulting ink composition in its coating characteristic, sprayability and printability, a material that improves its durability, a material that controls the color tone change, and the like. As the material that improves the coating characteristic of the ink composition, there are among others, paraffin wax, wax, dryer, a dispersing agent, a wetting agent, a crosslinking agent, a gelling agent, a thickener, a stabilizing agent, a delustering agent, a defoaming agent, an anti-mottle agent, a photoinitiator, a mildew-proofing agent, a plasticizing agent, and a thixotropy imparting agent. Also, as the material that improves durability, there is an ultraviolet absorbing agent, for example. Further, as the material that controls the color tone change, there are titanium oxide, calcium carbonate, silicon dioxide, alumina white ($Al_2O_3.xH_2O$), clay, settleability barium sulfate, gloss white, fast yellow G, fast yellow10G, disazo yellow AAA, disazo yellow AAMX, disazo yellow AAOT, yellow iron oxide, disazo yellow HR, dinitroaniline orange, disazo orange PMP, dianisidine orange, toluidine red, chlorinated para red, brilliant fast scarlet, pyrazolone red B, barium red 2B, calcium red 2B, barium lithol red, lake red C, brilliant carmine 6B, pigment scarlet 3B lake, rhodamine 6G PTMA toner, red oxide, naphthol red FGR, quinacridone magenta, rhodamine B PTAM toner, methyl violet PTMA toner, quinacridone red, dioxazine violet, victoria pure blue PTMA toner, phthalocyanine blue, alkaline blue toner, prussian blue, ultramarine blue, brilliant green PTMA toner, diamond green PTMA toner, phthalocyanine green, carbon black, zinc white, aluminum powder, extender pigment, bronze powder, fluorescent pigment, phosphorescent pigment, and pearl pigment. Selection is made from these additives on the basis of the need with respect to the printability, spray-ablity and coating characteristic as well as the compatibility to the ink composition, and their use is made in an appropriate dosage, and it is possible to use either one kind only or more than one in combination.

The color tone changes exhibited by the conventional indicators, for example the color tone changes exhibited by an indicator with copper(II) tetraiodomercurate ($Cu_2[HgI_4]$), which is a temperature indicating pigment containing mercury, are such that red occurs at a low temperature and dark brownish purple occurs at a high temperature, and these are both reddish so that it was difficult to modify so as to make it easy to visually observe the color tones before and after the color change. However, the iron triazole complex compounds are mostly compounds whose hue changes are such that pink occurs at a low temperature and white occurs at a high temperature. Therefore it is possible to simply modify the reversible temperature indicating member 14 to possess a desired color tone change by adding a pigment which does not change according to various temperature into the ink composition. For example, if an appropriate amount of phthalocyanine blue is added to the iron triazole complex compound within the reversible temperature indicating member 14, it is possible to obtain a temperature management indicator which respectively undergoes a color change to purple at a lower temperature and to blue at a high temperature, and if an appropriate amount of fast yellow is added to the iron triazole complex compound, it is possible to obtain a temperature management indicator which respectively undergoes a color change to dark pink at a low temperature and to yellow at a high temperature.

Examples in which a filmy resin-containing ink layer is formed by preparing the ink composition included with a binder resin, which is a resin raw material, as a resin component therein, and by volatilizing the solvent after coating, spraying or printing the ink composition, are described above. However, it is possible to form a filmy resin-containing ink layer by coating, spraying or printing an ink composition making use of a resin raw material monomer, and by curing the monomer and, if necessary, volatilizing the solvent. The ink composition may dispense with a solvent.

It is possible to use a commercially available ink vehicle which is made by mixing an afore-mentioned binder, a solvent and an additive. Examples of this ink vehicle include F-Gloss Medium (a product name of Dainippon Ink and Chemicals), Hy Unity Soy Medium (a product name of Toyo Ink Manufacturing Co., Ltd.), Nouvel Maxi Medium (a product name of Dainichiseika Color & Chemicals Mfg. Co., Ltd.), Nouvel Senior Soy Medium (a product name of Dainichiseika Color & Chemicals Mfg. Co., Ltd.), Q-SET INK 200 Medium (a product name of JUJO CHEMICAL CO., LTD.), No. 900 Medium (a product name of JUJO CHEMICAL CO., LTD.), High Set Mat Medium (a product name of MINO GROUP CO., LTD.), JRP Medium (a product name of Seiko advance Ltd.), PAS No. 800 Medium (a product name of JUJO CHEMICAL CO., LTD.), FBHD Medium (a product name of Toyo Ink Manufacturing Co., Ltd.), Styrene B Medium (a product name of Toyo Ink Manufacturing Co., Ltd.), and NEW LP Super R Medium (a product name of Toyo Ink Manufacturing Co., Ltd.). The commercially available ink vehicle can be of solvent drying type or of ultraviolet hardening type.

The afore-mentioned ink composition which is a mixture of the iron-containing complex compound and others can be obtained by mixing the iron-containing complex compound, the binder, and, if need be, the solvent and the additive by means of a kneading machine such as a ball mill, a roll mill and a sand mill. As the method for printing the thus obtained ink composition on one face of the base plate 12, it is possible to adopt, for example, gravure printing, offset printing, silk-screen printing, flexo printing, planographic printing, letterpress printing, and ink jet printing. The application method can be spraying by means of sprayer, etc. or brush painting or brush writing. As the base plate 12, it is possible to adopt a porous material such as paper filter, nonwoven fabric, cloth, wood free paper, and simili paper, or a porous or non-porous resin sheet made of a resin such as cellulose, cellulose derivative, polyolefin, polyvinyl chloride, polyvinylidene chloride, polyvinyl alcohol, polyester, polystyrene, rubber hydrochloride, polyamide, fluororesin, polybutene, polyvinyl butyral, polyethylene oxide, polyurethane, cellulose acetate butyrate, hydroxyethyl cellulose, and polyimide.

It is possible to provide an irreversible temperature indicating member 18, which is composed of an absorbent base member 20 and a thermofusible substance 22, via an adhesive layer 16 in the middle part of the surface of the reversible temperature indicating member 14, which is made by applying an ink composition containing the iron-containing complex compound on the one face of the base plate 12, as described above. This thermofusible substance 22 is a solid matter taking a shape of powder or granule for example, which melts at a specific temperature according to a predetermined temperature to be detected or measured. Examples of such thermofusible substance 22 include fatty acid derivatives, alcohol derivatives, ether derivatives, aldehyde derivatives, ketone derivatives, amine derivatives, amide derivatives, nitrile derivatives, hydrocarbon derivatives, thiol derivatives, and sulfide derivatives. These can be used singly or as a mixture of two or more.

The possible fatty acid derivatives are, among others, caproic acid, heptylic acid, caprylic acid, pelargonic acid, capric acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanoic acid, melissic acid, lacceric acid, acrylic acid, crotonic acid, isocrotonic acid, undecylenic acid, oleic acid, elaidic acid, erucic acid, brassidic acid, sorbic acid, linoleic acid, linolenic acid, propiolic acid, oxalic acid, malonic acid, succinic acid, glutaric acid, adipic acid, pimelic acid, suberic acid, azelaic acid, sebacic acid, octanoic acid, tricosanoic acid, tetratriacontanoic acid, 2,3-dimethylnonanoic acid, tetracosanoic acid, 2-hexenoic acid, brassidic acid, 2-methyl-2-dodecenoic acid, β-eleostearic acid, behenolic acid, cis-9,10-Methylenehexadecanoic acid, chaulmoogric acid, n-dodecyl 3,3'-thiodipropionate, trilaurin, palmitic acid anilide, stearic acid amide, zinc stearate, salicylic acid anilide, N-acetyl-L-glutamic acid, caproic acid-β-naphthylamide, enanthic acid phenylhydrazide, p-chlorophenacyl arachionate, cholesteryll formate, 1-aceto-2,3-distearin, n-pentadecyl thiolaurate, stearic acid chloride, palmitic anhydride, stearic acid-acetic acid anhydride, succinic acid, sebacic acid benzyl ammonium salt, 2-bromovaleric acid, methyl-α-sulfostearic acid sodium salt, 2-fluoroarachic acid, magnesium palmitate, magnesium stearate, magnesium myristate, and aluminum stearate.

The possible alcohol derivatives are, among others, octadecyl alcohol, cholesterin, D-mannit, galactitol, heptatriacontanol, hexadecane-2-ol, 1-trans-2-octadecenol, β-eleostearyl alcohol, cycloeicosanol, d(+)cellobiose, p,p'-biphenol, riboflavin, 4-chloro-2-methyl phenol, and 2-bromo-1-indanol. The possible ether derivatives are, among others, dihexadecyl ether, dioctadecyl ether, cytidine, adenosine, sodium phenoxyacetate, 1,3-bis(4-hydroxyphenoxy)benzene, and aluminum ethoxide.

The possible aldehyde derivatives include stearaldehyde, paralauryl aldehyde, para stearaldehyde, naphthaldehyde, p-chlorobenzaldehyde, phthalaldehyde, and 4-nitrobenzaldehyde.

The possible ketone derivatives include stearone, docosane-2-one, phenyl heptadecyl Ketone, cyclononadecane, vinyl heptadecyl ketone, 4,4'-bis dimethylamino benzophenone, bis(2,4-pentanedionato)calcium, and 1-chloro anthraquinone.

The possible amine derivatives include tricosylamine, dioctadecylamine, N,N-dimethyl octylamine, heptadeca methyleneimine, naphthylamine, ethyl p-aminobenzoate, o-tolylthiourea, sulfamethazine, guanidine nitrate, p-chloroaniline, and propylamine hydrochloride.

The possible amide derivatives include amide derivatives represented by $(R^1—CO—NH)—(C_pH_q)_r—(NH—CO—R^2)$ ($R^1$ and $R^2$ are a saturated or unsaturated hydrocarbon group and/or aromatic group; p, q and r are positive numbers) such as hexylamide, octacosylamide, N-methyl dodecylamide, N-methyl heptacosylamide, α-cyanoacetamide, salicylamide, dicyandiamide, 2-nitrobenzamide, N-bromoacetamide, N,N'-ethylenebisacetamide, N,N'-ethylenebispropionamide, N,N'-ethylenebisbutyramide, N,N'-ethylenebisvaleramide, N,N'-ethylenebiscaproamide, N,N'-ethylenebisenanthamide, N,N'-efhylenebiscaprylamide, N,N'-ethylenebispelargonamide, N,N'-ethylenebiscapramide, N,N'-ethylenebisundecylamide, N,N'-ethylenebislauramide, N,N'-ethylenebistridecylamide, N,N'-ethylenebismyristamide, N,N'-ethylenebispentadecylamide, N,N'-ethylenebispalmitamide, N,N'-ethylenebisheptadecylamide, N,N'-ethylenebisstearamide, N,N'-ethylenebisnonadecanamide, N,N'-ethylenebisarachinamide, N,N'-ethylenebisbehenamide, N,N'-ethylenebislignoceramide, N,N'-athylenebiscerotamide, N,N'-ethylenebisheptamide, N,N'-ethylenebismontanamide, N,N'-ethylenebismelissamide, N,N'-ethylenebislacceramide, N,N'-ethylenebislinoleamide, N,N'-ethylenebiserucamide, N,N'-trimethylenebisacetamide, N,N'-trimethylenebispropionamide, N,N'-trimethylenebisbutyramide, N,N'-trimethylenebisvaleramide, N,N'-trimethylenebiscaproamide, N,N'-rimethylenebisenanthamide, N,N'-trimethylenebiscaprylamide, N,N'-trimethylenebispelargonamide, N,N'-trimethylenebiscapramide, N,N'-trimethylenebisundecylamide, N,N'-trimethylenebislauramide, N,N'-trimethylenebistridecylamide, N,N'-trimethylenebismyristamide, N,N'-trimethylenebispentadecylamide, N,N'-trimethylenebispalmitamide, N,N'-trimethylenebisheptadecylamide, N,N'-trimethylenebisstearamide, N,N'-trimethylenebisnonadecanamide, N,N'-trimethylenebisarachinamide, N,N'-trimethylenebisbehenamide, N,N'-trimethylenebislignoceramide, N,N'-trimethylenebiscerotamide, N,N'-trimethylenebisheptamide, N,N'-trimethylenebismontanamide, N,N'-trimethylenebismelissamide, N,N'-trimethylenebislacceramide, N,N'-trimethylenebislinoleamide, and N,N'-trimethylenebiserucamide; and also include dicarboxylic acid amide compounds and their derivatives represented by $(R^1—NH—CO)—(C_sH_t)_u—(CO—NH—R^2)$ ($R^1$ and $R^2$ are a substituent group which is mainly configured from mainly a saturated or unsaturated hydrocarbon molecule; s, t, and u are positive numbers) such as oxamide, malonamide, succinamide, glutaramide, adipamide, pimelamide, suberamide, azelaamide, sebacamide, maleamide, fumaramide, phthalamide, isophthalamide, and terephthalamide.

As the amide derivative, it is also possible to adopt ALFLOW H-50 series (a product name of NOF CORPORATION; ALFLOW is a registered trademark), ALFLOW AD-281 series (a product name of NOF CORPORATION), ALFLOW AD-221 series (a product name of NOF CORPORATION), Bisamide series (a product name of Nippon Kasei Chemical Company Limited), SLIPACKS SERIES (a product name of Nippon Kasei Chemical Company Limited; SLIPACKS is a registered trademark), or Trinone series (a product name of Nippon Kasei Chemical Company Limited; Trinone is a registered trademark), which are industrial raw materials used as a dispersing agent, lubricant, etc.

The possible nitrile derivatives include pentadecane nitrile, margaronitrile, 2-napthonitrile, o-nitro phenoxy acetic acid, 3-bromobenzonitrile, 3-cyanopyridine, and 4-cyanophenol.

Then, the possible hydrocarbon derivatives include hexadecane, 1-nonatriacontene, trans-n-2-octadecene, hexatriacontylbenzene, 2-methylnaphthalene, picene, cyanuric chloride, 1-fluorononadecane, 1-chloroeicosane, 1-iodopentadecane, 1-bromoheptadecane, and 1,2,4,5-tetrakis(bromomethyl)benzene.

The possible thiol derivatives include pentadecane thiol, eicosane thiol, 2-naphthalene thiol, 2-mercaptoethyl ether, and 2-nitrobenzene sulfenyl chloride.

The possible sulfide derivatives include 1,3-dithiane, 2,11-dithia[3,3]paracyclophane, bis(4-hydroxy-3-methylphenyl) sulfide, 4,4'-dipyridyl sulfide, and 4-methyl mercapto phenol.

In order to fabricate the irreversible temperature indicating member 18 containing this kind of thermofusible substance, it is preferable that an ink composition is prepared by turning the thermofusible substance 22 together with, if necessary, a binder and a solvent into an ink, and then the ink composition is applied, by means of printing, spraying or coating as well as in the case of the reversible temperature indicating member 14, to an absorbent base member 20, which is adhered to the middle portion of the surface of the reversible temperature indicating member 14 via an adhesive layer 16. On the occasion of preparing the ink composition by turning the thermofusible substance 22 into the ink, it is possible to use a binder and a solvent like the ones used in the case of the ink composition constituting the irreversible temperature indicating member 18. Also, as the absorbent base member 20, a porous material is suitable, and examples include paper filter, non-woven fabric, cloth, wood free paper, and simili paper. The color of this absorbent base member 20 is preferably red, black, navy blue, blue, orange, green, deep red, etc.

The revealed faces of the irreversible temperature indicating member 18 and the reversible temperature indicating member 14 may be exposed to the ambience, but they may be covered with a polymer film 24. A raw material of this polymer film 24 may be polyester film such as polyethylene terephthalate film; polystyrene film; polyimide film; polycarbonate film; polystyrene film; cellulose triacetate film; polyvinyl alcohol film; polyvinyl chloride film; cellophane film; polyamide film such as nylon film; polymethyl (meth)acrylate film such as polymethyl acrylate and polymethyl methacrylate; polyolefin film such as polyethylene film, polypropylene film and poly-α-olefin film; polyvinyl acetate film. Also, each of these polymer films may be used alone or in combination with other(s) in a piled form, and it is possible that a film which is obtained by copolymerizing from these polymers is used. Furthermore, it is possible to use a film which is subjected to an ultraviolet protection processing such as inclusion of an ultraviolet absorber or coating with an ultraviolet barrier layer. The polymer film 24 is preferably 5-200 μm in thickness. Among others, in the case of a polyimide film, if is preferable to use Kapton (manufactured by DU PONT-TORAY CO., LTD.; a product name), due to heat resistance, light resistance and also durability.

Figure 2:
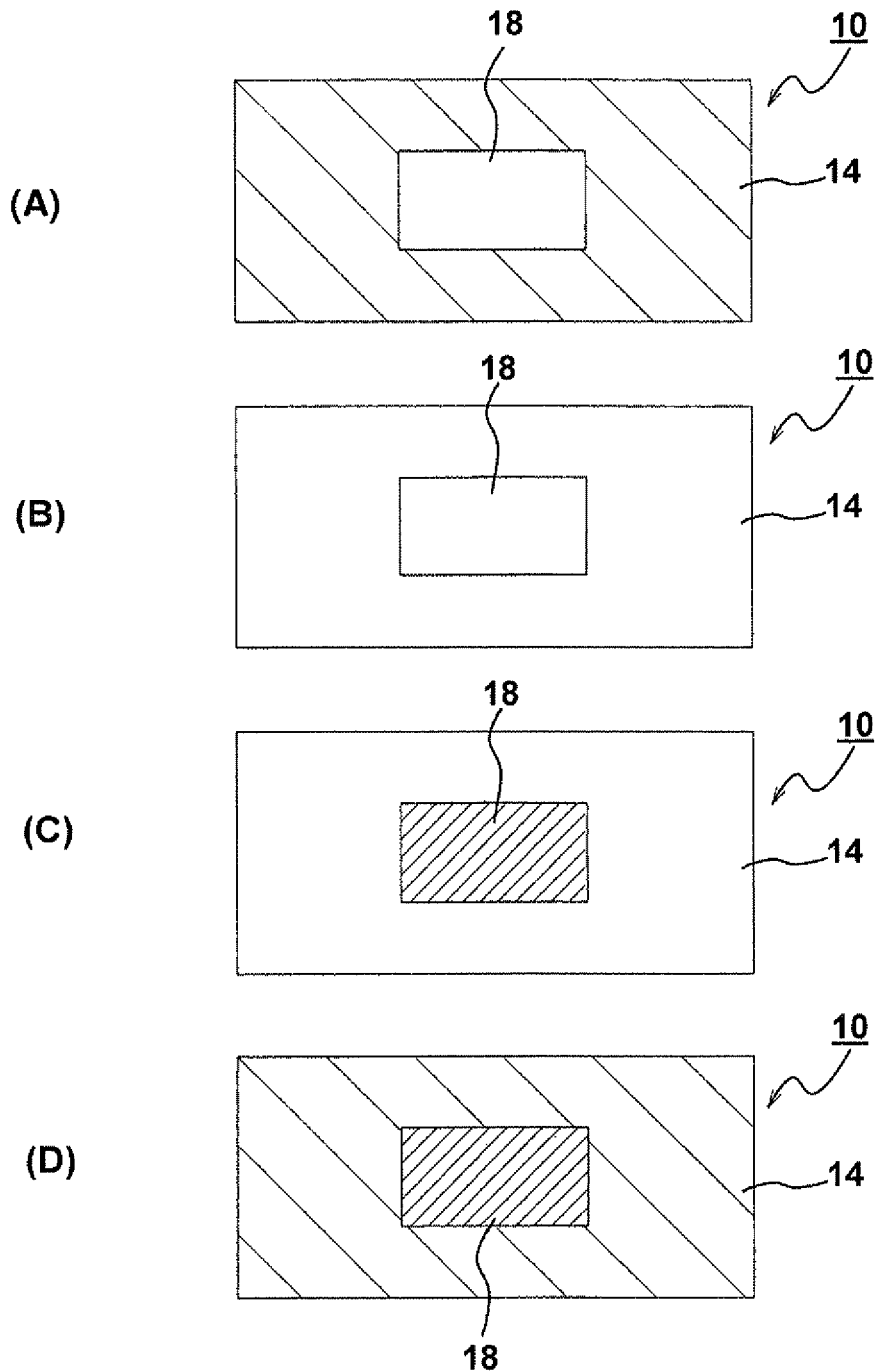
FIG. 2 is a plan view illustrating changes in color tone in response to the ambient temperature of the temperature management indicator shown in FIG. 1.

With the above-described temperature management indicator 10 shown in FIG. 1, it is possible to observe the surface of the reversible temperature indicating member 14 and that of the irreversible temperature indicating member 18 through the polymer film 24. The temperature management indicator 10 shown in FIG. 1 has, on one hand, the reversible temperature indicating member 14 which contains as its iron-containing complex compound an iron triazole complex compound, for example, but does not contain a material such as a pigment and a dye for adjusting color tone change, and has, on the other hand, an irreversible temperature indicating member 18 which makes use of a solid substance as the thermofusible substance 22, which melts at a temperature higher than the color-changing temperature of the iron triazole complex compound. For this reason, when the temperature management indicator 10 is in an atmosphere of a temperature lower than the color-changing temperature of the iron triazole complex compound, the reversible temperature indicating member 14 exhibits a chromatic color (mainly in pink), as shown in FIG. 2 (A). On the other hand, the irreversible temperature indicating member 18 surrounded circumferentially by the reversible temperature indicating member 14 exhibits a white color hiding the surface of the absorbent base member 20 of a chromatic color by virtue of the fact that the light is irregularly reflected by the thermofusible substance 22, which is a solid constituent of the member 18, or of the fact that the light penetrating through the irreversible temperature indicating member 18 is inhibited. Therefore, the difference in the color tone between the reversible temperature indicating member 14 and the irreversible temperature indicating member 18 of the temperature management indicator 10 is distinct so that it is possible to distinguish the two clearly with the eye.

When the temperature of the temperature management indicator 10 shown in FIG. 2 (A) is raised to or above the color change temperature of the iron triazole complex compound, the reversible temperature indicating member 14 changes its color tone to white (achromatic color), as shown in FIG. 2 (B). This phenomenon is caused as the iron triazole complex compound exhibits a hue of white in response to the spin crossover phenomenon taking place in the iron triazole complex compound. However, while the temperature is in the vicinity of the color change temperature of the iron triazole complex compound, the solid-state themofusible substance 22 of irreversible temperature indicating member 18 does not start fusing and thus continues to hide the surface of the absorbent base member 20. For this reason, the difference in the color tone between the reversible temperature indicating member 14 and the irreversible temperature indicating member 18 is rendered small so that it is difficult to distinguish the two clearly with the eye, as shown in FIG. 2 (B). On this occasion, if the ambient temperature of the temperature management indicator 10 is lowered below the color change temperature of the iron triazole complex compound, the reversible temperature indicating member 14 resumes its original color (mainly pink), and thus it becomes possible to clearly distinguish between the irreversible temperature indicating member 18 and the reversible temperature indicating member 14 with the eye, as shown in FIG. 2 (A).

On the other hand, when the temperature of the ambience of the temperature management indicator 10 in the state of FIG. 2 (B) is raised further, the solid-state thermofusible substance 22 of the irreversible temperature indicating member 18 fuses into a molten body. This molten body is absorbed into the absorbent base member 20 (ref. FIG. 1), and as a result, the chromatic surface of the absorbent base member 20 is revealed and thus it becomes possible to observe the surface of the absorbent base member 20 of the irreversible temperature indicating member 18, as shown in FIG. 2 (C). On this occasion, the iron triazole complex compound of the reversible temperature indicating member 14 is in a state wherein the spin crossover phenomenon has taken place and hence continues to exhibit the white color, and henceforth the reversible temperature indicating member 14 continues to exhibit the white color tone (achromatic color). Accordingly, as shown in FIG. 2 (C), only the irreversible temperature indicating member 18 can be clearly observed.

When the ambient temperature of the temperature management indicator 10 in the stated shown in FIG. 2 (C) is lowered below the color change temperature of the ion triazole complex compound, the reversible temperature indicating member 14 resumes the original color tone (mainly pink). However, the irreversible temperature indicating member 18 continues to reveal the surface of the absorbent base member 20, and thus the color tone of the surface of the absorbent base member 20 remains exhibited, as shown in FIG. 2 (D).

With the temperature management indicator 10 shown in FIG. 1, it is recognized that when it is in a state as shown in FIG. 2 (A), its ambient temperature is below the melting point of the solid-state thermofusible substance 22 contained in the irreversible temperature indicating member 18 and is also below the color-changing temperature of the iron triazole complex compound. Furthermore, when the temperature management indicator 10 is in a state as shown in FIG. 2 (B), one can know that the ambient temperature is below the melting point of the solid-state thermofusible substance 22 contained in the irreversible temperature indicating member 18, but that it is equal to or higher than the color-changing temperature of the iron triazole complex compound. Also, when the temperature management indicator 10 is taking a state as shown in FIG. 2 (C), it is recognized the ambient temperature is equal to or higher than the color-changing temperature of the iron triazole complex compound and also to be equal to or higher than the melting point of the solid-state thermofusible substance 22. In this manner, with the temperature management indicator 10 shown in FIG. 1, it is possible to know its ambient temperature by observing the color tones of the reversible temperature indicating member 14 and the irreversible temperature indicating member 18 with the eye.

Here, the temperature management indicator 10, when taking a state as shown in FIG. 2 (D), indicates that the ambient temperature of the temperature management indicator 10 is currently below the color-changing temperature of the iron triazole complex compound, but that it once was raised to or above the melting point of the solid-state thermofusible substance 22. In this manner with the temperature management indicator 10 shown in FIG. 1, it is possible to know the history of how its ambient temperature was raised.

The temperature management indicator 10 shown in FIG. 1 and FIG. 2 is so made that the color tone of the surface of the absorbent base member 20 of the irreversible temperature indicating member 18 is distinguishable from the color tone of the reversible temperature indicating member 14, which is created by the hue exhibited by the iron triazole complex compound, but it is possible to mark, in addition to this construction, letters on the surface of the absorbent base member 20 by some means like printing with a color invariant ink composition as shown in FIG. 3 (A). It is preferable that such letters represent the melting temperature of the solid-state thermofusible substance 22. The temperature management indicator 10 shown in FIG. 3 (A) is in a state whereat the surface of the irreversible temperature indicating member 18 has been revealed and thereby the letters have shown up, which is caused by first raising the ambient temperature to or above the color-changing temperature of the iron triazole complex compound, and then, after the color tone of the reversible temperature indicating member 14 was turned to white, by further raising the temperature to or above the melting temperature of the thermofusible substance 22 whereupon the thermally fused thermofusible substance 22 was absorbed in the absorbent base member 20. Thereafter, when the temperature is lowered until the original hue of the iron triazole complex compound is regained, the color tone of the reversible temperature indicating member 14 is also regained, as shown in FIG. 3 (B), but the letters on the surface of the irreversible temperature indicating member 18 remain showing and can be observed clearly.

It is also possible, in addition to the construction shown in FIGS. 1 through 3, to use different kinds of the iron triazole complex compound between separate reversible temperature indicating members 14a and 14b, as shown in FIG. 4, in a manner such that the color tones of the reversible temperature indicating members 14a and 14b, respectively, undergo changes at different temperatures to tones of similar or dissimilar type hue. FIG. 4 shows a state which has a history such that first the ambient temperature of the temperature management indicator 10 was once raised to or above the melting temperature of the thermofusible substance 22 whereby the surface of the irreversible temperature indicating member 18 was revealed and the letters showed up, and thereafter the temperature was lowered until the iron triazole complex compounds regained their original hues. With the temperature management indicator 10 shown in FIG. 4, it is possible to conduct a more close temperature management than in the case of the temperature management indicator 10 shown in FIGS. 1 through 3.

It is further possible, on top of the construction shown in FIGS. 1 through 3, to provide separate irreversible temperature indicating members 18a, 18b and 18c, which respectively contain thermofusible substances 22 of different melting points and to mark numbers and letters representing the respective melting temperatures, by some means like printing with a color invariant ink composition, on the surface of the absorbent base member 20, as shown in FIG. 5. By virtue of this, it is possible to know a more detailed history of the temperature rise than in the case of the temperature management indicator 10 shown in FIGS. 1 through 3. In the case of the temperature management indicator 10 shown in FIG. 5, the melting points of the thermofusible substances 22 included therein are arranged such that they increase in the order of the irreversible temperature indicating members 18a<18b<18c. Consequently, the temperature management indicator 10 shown in FIG. 5 represents that the temperature had been raised to such high temperature that the thermofusible substance 22 contained in the irreversible temperature indicating member 18b melts. Therefore, it is indicated that the ambient temperature of the temperature management indicator 10 had been raised to a temperature at which the thermofusible substances 22 contained in the irreversible temperature indicating members 18a and 18b melt, but that it has not reached the temperature at which the thermofusible substance 22 contained in the irreversible temperature indicating member 18c starts melting.

It is possible to introduce in an ink layer 21 of the irreversible temperature indicating member 18 of the temperature management indicator 10 shown in FIGS. 1 through 5, a solid-state thermofusible substance 22 containing a dye or a pigment, which can disperse in the thermofusible substance 22 melted at a predetermined temperature. By virtue of the ink layer 21, when the thermofusible substance 22 is melted, the molten body of the thermofusible substance colored by the dye or the pigment is absorbed and dispersed in the absorbent base member 20 whereby the absorbent base member 20 is colored.

It is also possible to use in the irreversible temperature indicating member 18 a color changeable layer containing a heat sensitive color changeable substance which undergoes an irreversible reaction entailing a color change in response to a specific temperature range corresponding to a predetermined temperature to be detected or measured. This heat sensitive color changeable substance may be a thermochoromism compound, a heat sensitive color changeable substance which is made by mixing of an organic dye and an organic acid to undergo a color change with reaction thereof at a specific temperature, or a heat sensitive paper. Examples of such thermochoromism compound include nickel-hexamethylenetetramine salt and copper hydroxide.

Figure 7:
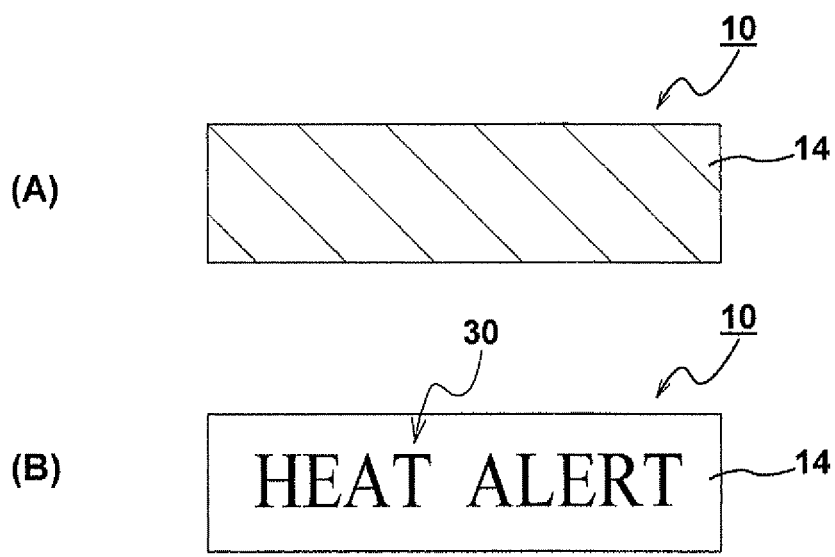
FIG. 7 is a plan view illustrating changes in color tone in response to the ambient temperature of the temperature management indicator shown in FIG. 6.

The solid-state thermofusible substance 22 and the absorbent base member 20 are used for the irreversible temperature indicating member 18 in the cases of the temperature management indicator 10 so far described, but it is also possible to form, on the surface of the reversible temperature indicating member 14 containing the iron triazole complex compound, an invariant display member 30, which has a color tone that is the same as that of the hue exhibited by the iron triazole complex compound at temperatures below the color-changing temperature of the iron triazole complex compound and that is different from the color tone of the hue exhibited by the iron triazole complex compound at temperatures equal to or higher than the color-changing temperature of the iron triazole complex compound, as shown in FIG. 6. This invariant display member 30 is simply formed by printing with a color invariant ink which exhibits a predetermined color tone on the surface of the reversible temperature indicating member 14. FIG. 6 shows an example wherein letters "HEAT ALERT" are printed, on the invariant display member 30 of the temperature management indicator 10, with a pink color ink having the same color tone as that of the hue exhibited by the iron triazole complex compound at temperatures below its color-changing temperature. With the temperature management indicator 10 shown in FIG. 6, it is not possible to visually recognize the invariant display member 30 at temperatures below the color-changing temperature of the iron triazole complex compound, since then the whole surface of the temperature management indicator 10 is in pink color, as shown in FIG. 7 (A). On the other hand, at temperatures equal to or higher than the color-changing temperature of the iron triazole complex compound, the invariant display member 30 consisting of the pink color letters "HEAT ALERT" pop up in the surface of the temperature management indicator 10, as shown in FIG. 7 (B), and are recognized visually. Then, as the temperature management indicator 10 is cooled to a temperature range wherein the iron triazole complex compound resumes the pink color from the white color, the surface of the temperature management indicator 10 returns to the pink color overall, as shown in FIG. 7 (A), and thus the invariant display member 30 becomes unrecognizable again. Incidentally, there are cases wherein a difference (hysteresis) occurs between the temperature at which the color of the iron triazole complex compound changes in response to rising temperature and the temperature at which the color of the iron triazole complex compound changes in response to falling temperature, and the magnitude of the hysteresis depends on the kind of the iron triazole complex compound used.

With the temperature management indicator 10 shown in FIGS. 7 (A) and (B), it is designed such that the invariant display member 30 is visually recognized at temperatures equal to or above the color-changing temperature of the iron triazole complex compound, but it is possible to arrange such that the invariant display member 30 is visually recognized at temperatures below the color-changing temperature of the iron triazole complex compound. Such a temperature management indicator 10 can be obtained by forming an invariant display member 30 having a color tone same as that of the hue exhibited by the iron triazole complex compound at temperatures equal to or above its color-changing temperature. Like this, it is possible to design such that messages such as "LOWERED TEMPERATURE ALERT" are displayed in response to the temperature changes by virtue of the reversible changes in color tone of the temperature management indicator 10 (not shown).

With regard to the temperature management indicator 10 shown in FIGS. 1 through 7, a release paper 28 is detachably adhered to the other face of the base plate 12 via an adhesive layer 26, as shown in FIGS. 1 and 6. By virtue of this, it is possible to attach the temperature management indicator 10 to a temperature variation portion of a structure by means of the adhesive layer 26 with ease.

Figure 8:
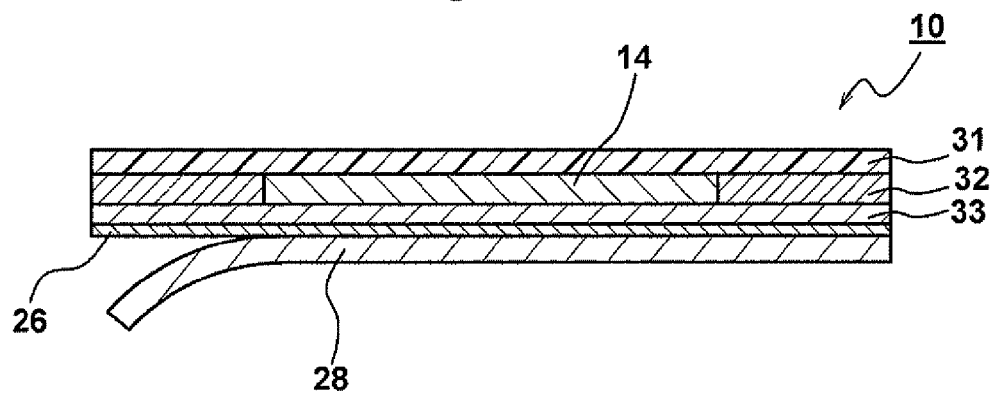
FIG. 8 is a schematic drawing of longitudinal section illustrating another example of a temperature management indicator according to the present invention.

With regard to the temperature management indicator 10 shown in FIG. 8, the reversible temperature indicating member 14 and the invariant temperature display member 32 are adhered to the transparent polymer film 31, which performs as the base plate as well, by some means like printing, and the adhesive layer 26 and the release paper 28 are adhered as described above via a white color invariant ink layer 33. When the polymer film 31 is a transparent flexible film, for example, the temperature management indicator 10 will have a high flexibility and as such it becomes possible to simply adhere it to an item to be subjected to the temperature management irrespective of whether the portion at which the adhesion is made has a flat face or a curved face.

Hence, with the temperature management indicator 10 shown in FIGS. 1 through 8, it is possible to effectively avoid the situations wherein the temperature of the temperature variant portion is increased by an external or an internal heat source to such a high point or wherein the temperature is lowered to such a low point that the quality of the structure equipped with the temperature variant portion is degraded or the structure becomes liable to cause burn and other harm to the user, by virtue of the capacity of alerting with the clearly visible display. Also by attaching the temperature management indicator 10 shown in FIGS. 1 through 8 to a machine, an installation, a precision instrument, food, etc. which have a liability of undergoing quality degradation when heated beyond a certain predetermined temperature or cooled beyond a certain predetermined temperature, it is possible to indicate to the user a temperature rising or a temperature falling of the machine, etc. to thereby allow prevention of over heating or over cooling of the machine, etc. which would lead to malfunctioning or degradation of the machine, etc. and burn on the user.

Now, the reversible temperature indicating member 14 shown in FIGS. 1 through 8 is made by applying to one of the faces of the base plate 12 the reversible temperature indicating pigment particles containing the iron-containing complex compound after it is made into an ink form by being combined with a resin element, but it is also possible to make the reversible temperature indicating member 14 by kneading the reversible temperature indicating pigment particles containing iron-containing complex compound into a resin and molding it into a specific shape. The resin can be exemplified by phenol resin, urea resin, melamine resin, unsaturated polyester resin, diallyl phthalate resin, epoxy resin, silicon-containing resin, alkyd resin, polyimide, polyaminobismaleimide, silicone resin, vinyl chloride resin, polyvinyl acetate resin, polyvinyl alcohol, polyvinyl butyral, polystyrene, ABS resin, polymethyl methacrylate, polyphenylene oxide, polyurethane, ionomer resin, cellulosic plastics, polyethylene, polypropylene, polyimide, polycarbonate, polyacetal, polyphenylene sulfide, polyvinylidene chloride, polyethylene terephthalate, fluororesin, or the like. These resins may be used singly or as a mixture of two or more, and may be colored by being added with a pigment or a dye. In making the reversible temperature indicating member 14 using the resin and the reversible temperature indicating pigment particles, it is possible to obtain the reversible temperature indicating member 14 of a predetermined shape such as film-like, tabular or three-dimensional, by casting a dough obtained by kneading reversible temperature indicating pigment particles in the resin having fluidity into a molding die having a predetermined shape and by hardening it and then removing it from the die. It is possible to obtain the temperature management indicator shown in FIG. 1 by adhering the thus obtained reversible temperature indicating member 14 to one of the faces of the base plate 12 by means of an adhesive or the like, and thereafter shaping the irreversible temperature indicating member 18. Thus, in the case where the reversible temperature indicating member 14 is formed in a manner such that the dough made by kneading the reversible temperature indicating pigment particles in the resin is adhered to the one face of the base plate 12, it is not necessary to provide the film 24 to cover the surface of the reversible temperature indicating member 14 because the reversible temperature indicating pigment particles are sufficiently insulated by the resin. Also, it is possible to prepare two reversible temperature indicating members 14a, 14b having respectively different color-changing temperatures, and adhere these reversible temperature indicating members 14a, 14b side by side to constitute the temperature management indicator.

EMBODIMENTS

Embodiments of the present invention are detailed more, but the present invention is not limited by these examples.

Example 1

In a reaction vessel, 10 g of ferrous sulfate heptahydrate ($FeSO_4.7H_2O$) was solved in 100 ml of distilled wafer, and 1 g of ascorbic acid was added to this. Two to three drops of concentrated sulfuric acid was added to this solution and all the solutes therein were dissolved by heating (Solution 1). In an another reaction vessel, 25 g of 4-amino-1,2,4-triazole was solved in 100 ml of ethanol, this was heated in a water bath (Solution 2). Then while Solution 1 was being heated, Solution 2 was added to it and the mixture was stirred for 1 to 2 hours; when the mixture was cooled to the room temperature, a precipitate of pink color was obtained. This precipitate was washed with ethanol as it was filtrated, and then it was let to dry naturally for 2 to 3 days and a powder of pink color was obtained in an amount of 12 g. This pink powder was found to be 4-amino-1,2,4-triazole iron sulfate complex compound. 10 g of the thus obtained iron triazole complex compound was kneaded with 1 g of butyl rubber as the binder and with 10 g of mineral spirit as the solvent to thereby prepare a reversible temperature indicating ink composition. The thus obtained reversible temperature indicating ink composition was applied to one of the faces of the base plate 12 consisting of a polyester film, and the solvent was removed by drying, and the reversible temperature indicating member 14, which was 15 mm wide and 30 mm long, was formed. The adhesive layer 26 was formed on the other face of this base plate 12.

Next, 100 g of sebacic acid having a melting point of about 120° C. as the thermofusible substance 22 was kneaded with 10 g of ethyl cellulose as the binder and with 160 g of toluene as the solvent to thereby prepare an ink composition for the irreversible temperature indicating member. The thus prepared ink composition for the irreversible temperature indicating member was printed allover the face of a 6 mm wide and 16 mm long print paper as the absorbent base member 20, on which had been printed in a color invariant ink a numeral of "120", and thus the irreversible temperature indicating member 18 containing the thermofusible substance 22 was fabricated. The particles of the thermofusible substance 22, which are not thermally melted, reflect the light irregularly so that the numeral "120" is veiled and as the result the irreversible temperature indicating member 18 exhibits a color tone of white.

The thus fabricated irreversible temperature indicating member 18 was pasted by its back face to the reversible temperature indicating member 14 via the adhesive layer 16 applied to one face of the latter. Then, the irreversible temperature indicating member 18 and the reversible temperature indicating member 14 were covered with a transparent polymer film 24 made of polyethylene terephthalate by means of the adhesive layer 16, and thus the temperature management indicator 10 was obtained. The reversible temperature indicating member 14 of the thus obtained temperature management indicator 10 exhibited pink color and the irreversible temperature indicating member 18 exhibited white color while the ambient temperature was lower than 60° C., as shown in FIG. 2 (A). On the other hand, when the ambient temperature of the temperature management indicator 10 became 60° C. or higher, for example when it exceeded 80° C., the reversible temperature indicating member 14 exhibited white color but the irreversible temperature indicating member 18 continued to exhibit white color, as shown in FIG. 2 (B). On account of this, the boundary between the reversible temperature indicating member 14 and the irreversible temperature indicating member 18 was not clear.

Further, when the ambient temperature of the temperature management indicator 10 was raised to about 120° C., the sebacic acid as the thermofusible substance 22, which had been added to the irreversible temperature indicating member 18, melted and was absorbed in the print paper used as the absorbent base material 20, and the numeral "120" printed on the print paper was observed to show up, as shown in FIG. 3 (A). Thereafter, the temperature management indicator 10 was left to sit and cool naturally, and when the normal temperature (10-30° C. or so) was reached, the numeral "120" remained on the irreversible temperature indicating member 18 showing the temperature history, whereas the surrounding reversible temperature indicating member 14 resumed the pink color after being white.

Example 2

In a reaction vessel, 70 g of ferrous sulfate heptahydrate ($FeSO_4.7H_2O$) and 20 g of ascorbic acid were solved in 900 ml of distilled water, and to this, 100 ml of 1N nitric acid aqueous solution was added to obtain a solution. 14 g of calcium nitrate was added to this solution, and the solution was stirred for 3-4 hours while it was warmed at about 40-50° C. with a water bath. After the stirring, white calcium sulfate precipitated and was removed by filtration and a filtrate solution was obtained (Solution 3). In an another reaction vessel, 143 g of potassium bromide was dissolved in 1000 ml of distilled water and a solution was obtained (Solution 4), and in another reaction vessel, 100 g of 4-amino-1,2,4-triazole and 20 g of ascorbic acid were added and dissolved in 500-700 ml of ethanol and a solution was obtained (Solution 5). Next, Solution 4 was added to Solution 3, while the latter was being warmed on a water bath, and the mixture was stirred well, and then Solution 5 was added to this. This mixture solution was stirred on the water bath and when the ethanol and the water constituting the solvents were distilled away sufficiently, a precipitation took place. After sufficient stirring, the solvents were further distilled away and the solution was cooled in a refrigerator or the like, whereupon a precipitate of a pink color was obtained. This precipitate was filtered while it was being washed with ethanol, and the precipitate was dried naturally for 2-3 days and 100 g of a pink powder was obtained. This pink powder was 4-amino-1,2,4-triazole iron bromide complex compound. Incidentally, barium nitrate is used in the cases of non-Patent Documents 2 and 3; however, barium nitrate is classified as a non-medical deleterious substance so that in the present example calcium nitrate was used in lieu.

50 g of the thus obtained iron triazole complex compound was kneaded with 5 g of ethyl cellulose as the binder and with 50 g of n-butanol as the solvent to thereby prepare a reversible temperature indicating ink composition. The thus obtained reversible temperature indicating ink composition was applied to one of the faces of the base plate 12 consisting of a white polyester film, and the solvent was removed by drying, and the reversible temperature indicating member 14, which was 10 mm wide and 40 mm long, was formed. The adhesive layer 26 was formed on the other face of this base plate 12. Next, as shown in FIG. 6, letters "HEAT ALERT" were printed on the face of the reversible temperature indicating member 14 with a color invariant ink composition of a pink color, and after drying, the invariant display member 30 was formed. Further, the face of the invariant display member 30 was covered with a 16 μm thick polyethylene terephthalate film 24, which is backed with an adhesive layer 16, and the temperature management indicator 10, shown in FIG. 6, was fabricated.

In the temperature management indicator 10, constructed as shown in FIG. 6, the reversible temperature indicating member 14 exhibited pink color while the ambient temperature was lower than about 40° C. For this reason, the letters "HEAT ALERT" printed on the invariant display member 30 with the pink-colored color invariant ink composition were not visible, as shown in FIG. 7 (A). On the other hand, when the ambient temperature became 40° C. or higher, for example when it exceeded 50° C., the iron triazole complex compound in the reversible temperature indicating member 14 turned white, and the letters "HEAT ALERT" consisting of the invariant display member 30 showed up in the reversible temperature indicating member 14, as shown in FIG. 7 (B). Next, when the ambient temperature of the temperature management indicator 10 was cooled to about 25° C. or lower, the reversible temperature indicating member 14 resumes the pink color and the letters "HEAT ALERT" on the invariant display member 30 stopped being visible. Incidentally, with the iron triazole complex compound, the hysteresis temperature, which is the difference between the color-changing temperature responsive to temperature rising and the color-changing temperature responsive to temperature falling was about 15-20° C.

Example 3

2 g of the 4-amino-1,2,4-triazole iron bromide complex compound which had been synthesized in Example 2 were kneaded with a resin [consisting of 10 g of jER828 (manufactured by Japan Epoxy Resins Co. Ltd., jER being a registered trademark of Japan Epoxy Resins Co. Ltd.), and 5.5 g of jERCURE ST12 (manufactured by Japan Epoxy Resins Co. Ltd., jERCURE being a registered trademark of Japan Epoxy Resins Co. Ltd.)], and a dough was obtained. With this dough a molding die made of polypropylene, which had an inner dimension of 20 mm in width, 20 mm in length and 20 mm in height, was filled up. The inner wall of this molding die was coated with Mold Releasing Agents DAIFREE GA-7500 (manufactured by DAIKIN INDUSTRIES, LTD). After filling the molding die with the dough, the dough was let to sit for 24 hours to naturally undergo a primary hardening, and then it underwent a secondary hardening by being heated at 80° C. for 3 hours, and it was removed from the molding die. The thus obtained shaped item is referred to as Structure A.

Also, the dough obtained by kneading epoxy resin with 2 g of the 4-amino-1,2,4-triazole iron sulfate complex compound synthesized in Example 1 was similarly poured into the molding die and hardened and the thus obtained shaped item is referred to as Structure B.

Structures A and B thus obtained were flattened on one side of them, and they were bound together with epoxy resin and thereby a temperature management indicator was obtained. The thus obtained temperature management indicator was heated on a water bath for chemical experimentation, and as the temperature of the water in the water bath was raised, and then the temperature management indicator underwent changes as shown in the following Table 1.

TABLE 1

Changes Experienced by Temperature Management Indicator

| Water Temperature (° C.) | Structure-A Side | Structure-B Side | Temperature Indication State |
|---|---|---|---|
| 30 | Pink | Pink | Temperature Indication State 1 |
| 50 | White | Pink | Temperature Indication State 2 |
| 80 | White | White | Temperature Indication State 3 |

Example 4

Using the temperature management indicator as obtained in Example 3, a temperature management was conducted. A container containing this temperature management indicator and ethyl alcohol (boiling temperature: 78.3° C.) was heated on a water bath, an ethanol solution was made by dissolving a hydrophobic solid in the ethyl alcohol. On this occasion, the heating was controlled in a manner such that the water temperature of the water bath was such that the temperature indicator always maintained the temperature indication state 2 of Table 1, and as the result it was possible to conduct a suitable heating for the evaporation and boiling of the ethyl alcohol were prevented.

Example 5

In a reaction vessel, 55.6 g of ferrous sulfate heptahydrate ($FeSO_4.7H_2O$) and 8 g of ascorbic acid were solved in 400 ml of distilled water to obtain a solution (Solution 6). In an another reaction vessel, 52.4 g of barium nitrate was added and dissolved in 400 ml of distilled water, and this solution was added to Solution 6, and was stirred for 3-4 hours while being warmed at about 40-50° C. on the water bath. After the stirring, the white precipitated barium sulfate was removed by filtration, and a filtrate solution was obtained (Solution 7). To this Solution 7, 100 g of potassium tetrafluoroborate was added, and similarly as before, the solution was stirred for 3-4 hours while being heated at about 40-50° C. on a water bath. After the stirring, a white color precipitate of potassium nitrate was removed by filtration, and a filtrate solution was obtained (Solution 8). In a still another reaction vessel, 50 g of 4-amino-1,2,4-triazole was added, which was then dissolved in 400 ml of ethanol while being heated on a water bath, and this solution was added to Solution 8, as the latter was being stirred and warmed at about 50-60° C. on a water bath, and the solvent ethanol was sufficiently removed by distillation. Thereafter as the reaction solution of the mixture was cooled in a refrigerator there occurred a precipitation. This precipitate was filtered while it was being washed with ethanol, and the precipitate was dried naturally for 2-3 days and 70 g of a pink powder was obtained. This pink powder was 4-amino-1,2,4-triazole iron borate complex compound.

Figure 9:
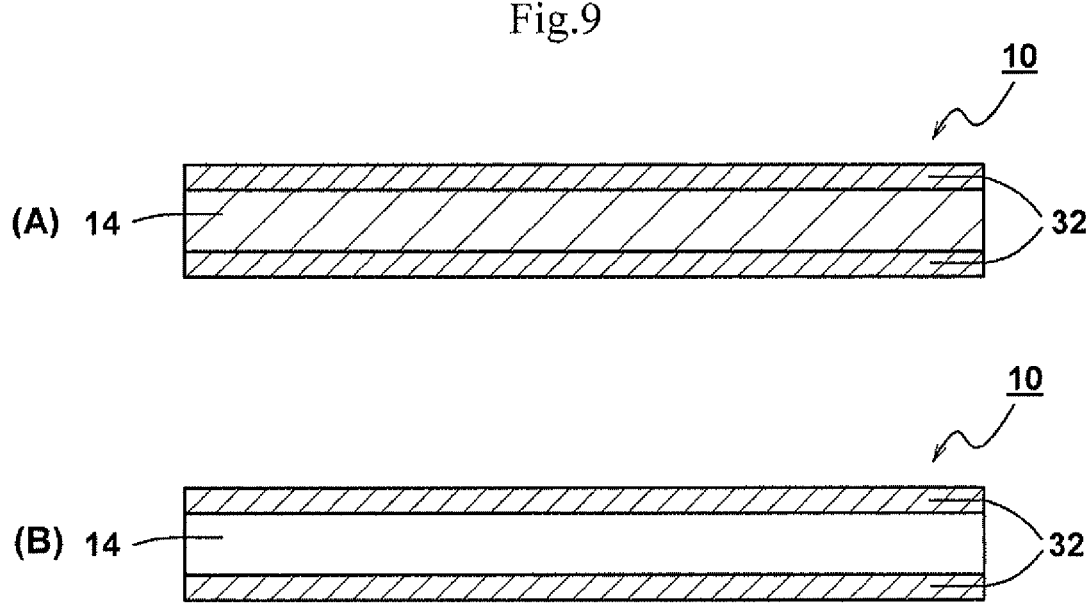
FIG. 9 is a plan view illustrating changes in response to the ambient temperature of the temperature management indicator shown in FIG. 8.

10 g of the thus obtained iron triazole complex compound was kneaded with 10 g of commercially available PAS No. 800 medium as the medium and 10 g of butyl cellosolve as the solvent in a mashing mixer, and a reversible temperature indicating ink composition was prepared. The thus obtained reversible temperature indicating ink composition was applied to one face of the transparent polymer film 31, which consists of a transparent polyethylene terephthalate film and performs as the base plate as well, by screen printing, as shown in FIG. 8, and the solvent was removed by drying. Then, in order to form, on the polymer film 31, the invariant display member 32 with a pink-colored color invariant ink composition and the white color invariant ink layer 33 with a white-colored color invariant ink composition, these compositions were applied by screen printing, and then the solvent was removed by drying, and the adhesive layer 26 and the release paper 28 were adhered to thereby fabricate the temperature management indicator 10 in a shape of a belt, which is 20 mm wide and 100 mm long, as shown in FIG. 9.

Figure 10:
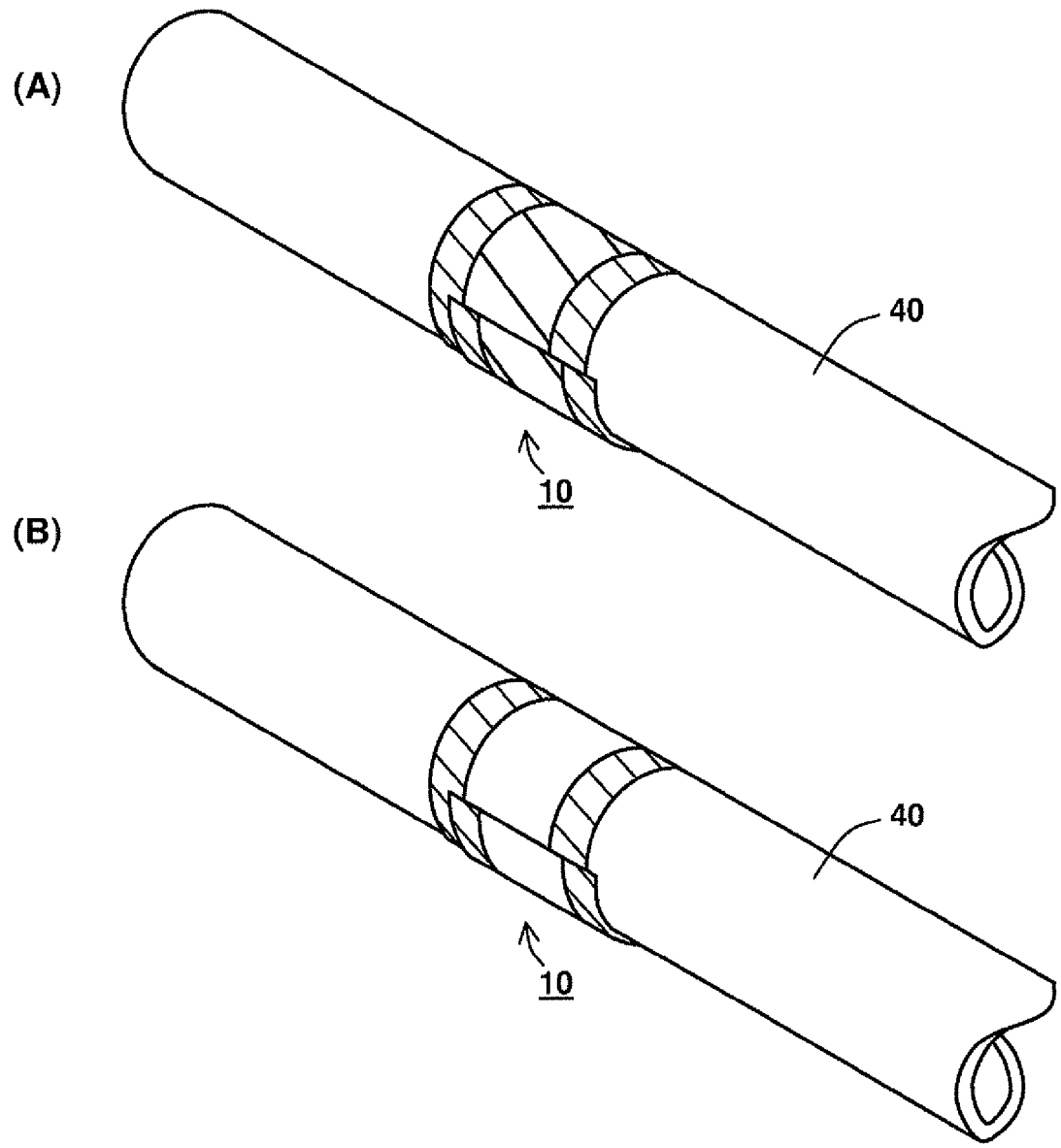
FIG. 10 is a perspective view illustrating the manner in which the temperature management indicator shown in FIG. 8 is used.

This temperature management indicator 10 was adhered, as shown in FIG. 10, to the external face of a metallic pipe 40, in which a high temperature liquid or gas, for example hot water and high pressure steam is passed, and which is the subject of the temperature management. While the surface of the pipe 40 was below about 40° C., the temperature management indicator 10 was exhibiting pink color all over, as shown in FIG. 10 (A), due to the pink color of the reversible temperature indicating member 14 and the pink color of the invariant display member 32. On the other hand, when the surface of the pipe 40 became 40° C. or higher, for example about 60° C., as some hot water or the like passed through the pipe 40, the temperature management indicator 10 exhibited a stripe color indication, as shown in FIG. 10 (B), with the reversible temperature indicating member 14 changing to white color and the invariant display member 32 showing pink color, and thus it was possible to visually recognize that the surface of the pipe 40 was at a high temperature. When the surface of the pipe 40 became about 30° C. or lower, the temperature management indicator 10 again exhibited pink color all over, as shown in FIG. 10 (A), and thus it was possible to recognize that the pipe surface had cooled. These color changing phenomena of the temperature management indicator 10 were observed to be reversible. Also, as a property of this temperature management indicator 10, there occurs a difference between ifs color-changing temperature responsive to temperature rising and its color-changing temperature responsive to temperature falling (hysteresis phenomenon), so that once the temperature has risen and the pipe surface has gotten a high temperature, the temperature management indicator does not resume the former color until the pipe surface becomes sufficiently cooled, and thus this makes a safer temperature indication method, Example 6

In a reaction vessel, 14 g of ferrous sulfate heptahydrate ($FeSO_4·7H_2O$) and 2 g of ascorbic acid were solved in 200 ml of nitric acid to obtain a solution (Solution 9). To this Solution 9 was added 13 g of 0.1 mol/l of barium nitrate, and the solution was stirred for 3-4 hours while being warmed at about 40-50° C. on a water bath. After the stirring, the white precipitated barium sulfate was removed by filtration, and a filtrate solution was obtained (Solution 10). Then, in an another reaction vessel, 10.4 g of 1,2,4-triazole was added and was dissolved in 200 ml of ethanol while being warmed on a water bath, and this solution was added to Solution 10, as the latter was being stirred and warmed at about 50-60° C. on a water bath, and the combined solution was stirred for 1 to 2 hours. After the stirring, the solvent was distilled away by means of a rotary evaporator and a pink powder was obtained. This pink power was 1,2,4-triazole iron nitrate complex compound.

Next, another Solution 10 was obtained in the similar method as above. Then, 12.6 g of 4-amino-1,2,4-triazole was added in an another reaction vessel, and was dissolved in 200 ml of ethanol while being warmed on a water bath, and this solution was added to Solution 10, as the latter was being stirred and warmed at about 50-60° C. on a water bath, and the combined solution was stirred for 1 to 2 hours. After the stirring, the solvent was distilled away by means of the rotary evaporator and a pink powder was obtained. This pink power was found 4-amino-1,2,4-triazole iron nitrate complex compound.

10 g of each powder of the 1,2,4-triazole iron nitrate complex compound and the 4-amino-1,2,4-triazole iron nitrate complex compound, which had been obtained by the above-described methods, were added into a reaction vessel, followed by 100 g of distilled water, and the solution was stirred for about an hour while being warmed at about 60° C. on a water bath. Thereafter, the water was evaporated in a thermostatic bath of 105° C., and the remnant was dried and a power of deep pink color was obtained. This deep pink-colored powder is thought to be iron triazole-containing nitrate complex compound, which is a mixture of a plurality of ligands consisting of 1,2,4-triazole and 4-amino-1,2,4-triazole.

Using the thus obtained iron triazole complex compound, a temperature management indicator 10 was fabricated in the similar manner as Example 5.

This temperature management indicator 10 was adhered to a place as shown in FIG. 10, similarly as in the case of Example 5, While the surface of the pipe 40 was below about 45° C., the temperature management indicator 10 was exhibiting a pink color tone all over, as shown in FIG. 10 (A), due to the pink color of the reversible temperature indicating member 14 and the pink color of the invariant display member 32. On the other hand, when the surface of the pipe 40 became 45° C. or higher, for example about 55° C., as some hot water or the like passed through the pipe 40, the temperature management indicator 10 exhibited a stripe color indication, as shown in FIG. 10 (B), with the reversible temperature indicating member 14 changing to pale yellow and the invariant display member 32 continuing to show pink color, and thus it was possible to visually recognize that the surface of the pipe 40 is at a high temperature. Then, when the surface of the pipe 40 became about 40° C. or lower, the temperature management indicator 10 again exhibited pink color all over, as shown in FIG. 10 (A), and thus it was possible to recognize that the pipe surface had cooled. These color changing phenomena of the temperature management indicator 10 were observed to be reversible. Also, as a property of this temperature management indicator 10, it was found that compared to the temperature management indicator 10 described in Example 5, wherein 4-amino-1,2,4-triazole iron tetrafluoroborate complex compound was used as the reversible temperature indicating pigment, the magnitude of the hysteresis phenomenon in the case of the present temperature management indicator 10 was smaller (the temperature difference in the hysteresis phenomenon was about 15° C.), and thus it was found possible to make different kinds of the temperature management indicators 10, respectively suitable to different applications, through a selection of reversible temperature indicating pigment.

Examples 7 and Comparative Example 1

A temperature management indicator heat-proof test on the temperature management indicator 10 obtained in Example 1, in which the present invention was embodied, was conducted (Example 7). For comparison, the same heat-proof test on a commercially available combination type Thermolabel A-80 (manufactured by NICHIYU GIKEN KOGYO CO., LTD; Thermolabel is a registered trademark of NICHIYU GIKEN KOGYO CO., LTD and contains mercury halide complex compound), which does not embody the present invention were conducted (Comparative Example 1). As the method for the heat-proof test, the temperature management indicator 10 of FIG. 2 and the commercially available temperature management indicator were attached to a standard test plate A1050P (product name of Nippon Testpanel Co., Ltd; 150 mm in width, 70 mm in length and 0.5 mm in thickness), and the standard test plate as the test sample was subjected to a continuous heating at 90° C. in a thermostatic bath FC-410 (product name of ADVANTEC Group). After 100 days, the appearance of the temperature management indicator 10 and that of the commercially available temperature management indicator were examined: there was not much change in the appearance of the temperature management indicator 10; the commercially available temperature management indicator, which measured 15 mm in width and 30 mm in length before the heat-proof test, retained its prior-to-test hue only in its central part measuring 10 mm in width and 25 mm in length, and elsewhere, that is, the indicator's marginal portion having a width of from about 2 to 2.5 mm, the reversible ink composition was observed to have degraded to have a while color. Also, the degraded white portion, when heated, did not change its color and thus had lost its function of temperature detection. It is thought that these were caused as the mercury halide complex compound used in the reversible temperature indicating ink composition of the commercially available temperature management indicator was sublimated during the long-term heat-proof test from the marginal portion of the indicator. In contrast to this, sublimation of the 4-amino-1,2,4-triazole iron sulfate complex compound used in the reversible temperature indicating ink composition of the temperature management indicator 10 was not observed, and in response to a heating conducted after the long-term heat-proof test, the indicator 10 changed the color reversibly, and thus retained its temperature indicative function.

INDUSTRIAL APPLICABILITY

The temperature management indicator according to the present invention is useful for temperature management of mechanical installation, for prevention of accidents arising from overheating in distribution installation, for monitoring the temperature history of constant temperature preservation products, for prevention of burn, for prevention of malfunctioning of and temperature rise monitoring of installations and precision machines, and for temperature management of foods, etc.

What is claimed is:
1. A temperature management indicator comprising;
a reversible temperature indicating member including reversible temperature indicating pigment particles devoid of mercury, which reversibly undergoes color changes at a predetermined temperature,
an irreversible temperature indicating member devoid of mercury, which undergoes color changes to tones of dissimilar type hue against tones of said reversible temperature indicating member, is arranged on an indicator base plate such that said irreversible temperature indicating member and said reversible temperature indicating member lie side by side or overlap each other in part,
in said reversible temperature indicating member, said reversible temperature indicating pigment particles contain an iron-containing complex compound and are dispensed to be dispersed in a resin thereof, and said irreversible temperature indicating member includes:
a thermofusible substance-absorptive base material, which is covered with a thermofusible substance of a solid state on a surface thereof with the thermofusible substance fused to be irreversibly absorbed so as to expose the surface when the thermofusible substance of the solid state is turned to a thermofused state at a predetermined detection temperature not lower than a color-changing temperature of the reversible temperature indicating pigment; or
a thermofusible substance-permeable material, which is covered with a colored thermofusible substance of a solid state on a surface thereof, and which exhibits a color when the colored thermofusible substance irreversibly is fused to permeates when the colored thermofusible substance of the solid state is turned to a thermofused state at a predetermined detection temperature not lower than the color-changing temperature of the reversible temperature indicating pigment; or
a color changeable layer containing a temperature sensitive color variant substance that changes color by undergoing an irreversible reaction at a predetermined detection temperature not lower than the color-changing temperature of the reversible temperature indicating pigment.
2. The temperature management indicator according to claim 1, wherein said iron-containing complex compound is an iron triazole complex compound.
3. The temperature management indicator according to claim 1, wherein said reversible temperature indicating pigment particles are dispersed in said resin within said temperature indicating member configuring of an ink layer or a shaped body.
4. The temperature management indicator according to claim 3, wherein said reversible temperature indicating pigment particles are dispersed in said ink layer, which is formed by making an ink from a resin component constituting said resin and said particles and then by applying the ink onto a base plate; or are dispersed in said shaped body, which is formed to have a predetermined configuration after said particles are kneaded in said resin.
5. The temperature management indicator according to claim 1, wherein an invariant display member, which is provided with a color different from a hue that is exhibited by said reversible temperature indicating pigment either at temperatures below the color-changing temperature of the reversible temperature indicating pigment or at temperatures not lower than said color-changing temperature, is formed on the surface of said reversible temperature indicating member.
6. The temperature management indicator according to claim 1, wherein said reversible temperature indicating member is covered with a polymer film selected from the group consisting of polyester film, polystyrene film, polyimide film, polycarbonate film, cellulose triacetate film, polyvinyl alcohol film, polyvinyl chloride film, cellophane film, polyamide film, polymethyl (meth)acrylate film, polyolefin film, and polyvinyl acetate film.
7. A structure equipped with;
a temperature variable portion, which the temperature of said temperature variable portion is changeable in response to a heat source placed outside or inside said structure,
wherein the temperature management indicator as defined in claim 1 is attached to said temperature variable portion of said structure.

* * * * *